US010647463B2

(12) United States Patent
Steenhoek et al.

(10) Patent No.: US 10,647,463 B2
(45) Date of Patent: May 12, 2020

(54) BALE PROCESSOR AND BINDING REMOVER

(71) Applicant: Vermeer Manufacturing Company, Pella, IA (US)

(72) Inventors: Curtis J. Steenhoek, Pella, IA (US); Gary Verhoef, Pella, IA (US); Matthew William Dykema, Pella, IA (US); Brian Michael Johnson, Monroe, IA (US); Gary D. Moffet, Otley, IA (US); Jay C. Van Roekel, Pella, IA (US); Scott A. Weishaar, Sioux Falls, SD (US); John G. Gardner, Altoona, IA (US)

(73) Assignee: Vermeer Manufacturing Company, Pella, IA (US)

( * ) Notice: Subject to any disclaimer, the term of this patent is extended or adjusted under 35 U.S.C. 154(b) by 816 days.

(21) Appl. No.: 15/179,199

(22) Filed: Jun. 10, 2016

(65) Prior Publication Data
US 2016/0362214 A1    Dec. 15, 2016

Related U.S. Application Data

(60) Provisional application No. 62/175,031, filed on Jun. 12, 2015.

(51) Int. Cl.
*B65B 69/00*    (2006.01)
*A01F 29/00*    (2006.01)
*A01D 87/12*    (2006.01)

(52) U.S. Cl.
CPC ........ *B65B 69/0025* (2013.01); *A01D 87/127* (2013.01); *A01F 29/00* (2013.01);
(Continued)

(58) Field of Classification Search
CPC ............... Y10S 83/909; B65B 69/0025; Y10T 29/5139; Y10T 29/49821; Y10T 29/49819
(Continued)

(56) References Cited

U.S. PATENT DOCUMENTS 3,513,522 A * 5/1970 Thomson ................ A01F 12/14
242/470
4,348,801 A     9/1982 Dumont et al.
(Continued)

FOREIGN PATENT DOCUMENTS

DE        2816912 B  *  8/1979
DE        4241672 A1 *  6/1994
(Continued)

OTHER PUBLICATIONS

Machine Translation of JP 10-309690-A, which JP '690 was published Nov. 1998.*
(Continued)

*Primary Examiner* — Erica E Cadugan
(74) *Attorney, Agent, or Firm* — Michael Best & Friedrich LLP

(57) ABSTRACT

A bale processing machine that removes a binding from a bale allows for rapid bale processing. A method for removing the binding from the bale includes supporting the bale with a bale support at an elevated positon and securing the binding to a binding engagement device. The method also includes cutting the binding and removing the bale support from beneath the bale, such that at least a portion of the bale falls by gravity away from the binding secured to the binding engagement device.

18 Claims, 35 Drawing Sheets

(52) U.S. Cl.
CPC ........... *A01F 29/005* (2013.01); *Y10S 83/909* (2013.01); *Y10T 29/49819* (2015.01); *Y10T 29/49821* (2015.01); *Y10T 29/5139* (2015.01)

(58) Field of Classification Search
USPC ................... 29/564.3, 426.4, 426.3; 83/909

See application file for complete search history.

(56) References Cited

U.S. PATENT DOCUMENTS

| | | | |
|---|---|---|---|
| 4,850,087 A * | 7/1989 | Gronau | B65B 69/0025 29/33 R |
| 5,445,490 A * | 8/1995 | Whitehead | B65B 69/0025 414/607 |
| 6,263,774 B1 | 7/2001 | Rogness et al. | |
| 7,165,928 B2 | 1/2007 | Haverdink et al. | |
| 7,785,057 B2 | 8/2010 | Noonan et al. | |
| 8,021,095 B2 | 9/2011 | Haugstad | |
| 8,769,801 B2 | 7/2014 | Lyman | |
| 2003/0192416 A1 | 10/2003 | Platon et al. | |
| 2013/0149082 A1 | 6/2013 | Sheedy et al. | |
| 2014/0230619 A1 | 8/2014 | Bayer et al. | |

FOREIGN PATENT DOCUMENTS

| | | | |
|---|---|---|---|
| DE | 19801307 C1 | * | 7/1999 |
| EP | 0156332 A2 | | 10/1985 |
| EP | 1874638 B1 | | 7/2013 |
| FR | 2417436 A1 | * | 9/1979 |
| JP | 03-289429 A | * | 12/1991 |
| JP | 06-239323 A | * | 8/1994 |
| JP | 10-309690 A | * | 11/1998 |
| JP | 11-236019 A | * | 8/1999 |
| JP | 2000-033921 A | * | 2/2000 |
| JP | 2000238732 A | | 9/2000 |
| WO | WO-90/00498 A | * | 1/1990 |
| WO | WO-91/01919 A1 | * | 2/1991 |
| WO | WO-92/13768 A1 | * | 8/1992 |
| WO | WO-2008/071856 A1 | * | 6/2008 |
| WO | 2010016045 A1 | | 2/2010 |
| WO | 2013154746 A1 | | 10/2013 |

OTHER PUBLICATIONS

Machine Translation of JP 06-239323-A, which JP '323 was published Aug. 1994.*
Machine Translation of DE 19801307 C1, which DE '307 was published Jul. 1999.*
European Search Report dated Oct. 14, 2016 for European Application No. 16 17 4046 (5 pgs).

* cited by examiner

BALE PROCESSOR AND BINDING REMOVER

CROSS REFERENCE TO RELATED APPLICATION

This application claims the benefit of U.S. Provisional Patent Application Ser. No. 62/175,031, filed Jun. 12, 2015, which application is hereby incorporated by reference in its entirety.

BACKGROUND

Organic material is often collected and packaged into bales to ease transport and storage. Bales can be formed in any of a variety of different sizes and shapes including round, square and rectangular shapes. Material that is commonly baled includes cornstalks, grass, dried grass (hay), straw, above-ground corn residue (corn stalks, leaves, husks, and cobs), etc. To secure the material in the form of a bale, a binding is used to ensure that the bale does not inadvertently deconstruct. Types of binding include twine, plastic wrap, netting, wire, etc. When access to the material that is baled is desired, the binding must be removed from the bale, which can be difficult.

Binding removal can be completed by hand by cutting the binding with a knife and then peeling the binding off of the bale by manually pulling it from the bale. Because the bale is typically resting on a surface during this process, the person must roll, lift, or maneuver around the bale to remove the binding from underneath the bale.

Mechanical removal of the binding has included grabbing the binding with a machine to remove it from the bale. However, complete removal of the binding from the bale is often difficult to attain, as, for example, the binding can tear prior to being completely removed and/or the machine may fail to secure all of the binding for successful removal. This difficulty with the binding removal step can lead to a time consuming and cumbersome process.

Additionally, bale processing equipment is available to promote bale deconstruction. Many such bale processing units are stand-alone machines. However, for larger-scale processing bales (such as for biomass), it is desired to have a more efficient apparatus that can be used as part of a high through-put system.

Therefore, improvements in the processing and mechanical removal of binding from bales and concurrent processing of such bales are needed.

SUMMARY

The present disclosure relates generally to bale processing and bale binding removal. In one possible configuration, and by non-limiting example, a bale binding removal machine elevates the bale, cuts the bale, and removes the binding from the bale.

In a first aspect of the present disclosure, a method for removing a binding from a bale disclosed. The method includes supporting the bale with a bale support at an elevated positon and securing the binding to a binding engagement device. The method also includes cutting the binding and removing the bale support from beneath the bale such that at least a portion of the bale falls by gravity away from the binding secured to the binding engagement device.

In a second aspect of the present disclosure, a bale processing apparatus is disclosed. The bale processing apparatus includes a bale support and a cutting unit. The cutting unit includes a bale support structure coupled to a blade. The bale support and cutting unit are movable between a lowered position and a raised position. The bale support and cutting unit are configured to receive a bale from a conveyor while the bale support and cutting unit are in the lowered position. The bale support structure and the blade are configured to cooperate to support the bale when the bale support and cutting unit are in the lowered positon. The bale support and cutting unit are also configured such that the blade extends through a portion of a thickness of the bale when the bale support and cutting unit are in the raised position. The bale support and cutting unit are configured such that the bale support structure allows downward movement of the bale when the bale support and cutting unit are in the raised position.

The bale processing apparatus also includes a bale stop positioned above the bale when the bale is supported on the bale support and cutting unit. The bale support and cutting unit are configured to lift the bale as the bale support and cutting unit move from the lowered positon toward the raised position until the bale engages the bale stop structure. The bale support and cutting unit are also configured to continue to move toward the raised position after the bale engages the bale stop such that the blade cuts through the bale and the bale support moves at least partially out from beneath the bale. The bale processing apparatus also includes a bale binding engagement device that engages a binding at a top side of the bale when the bale is engaged with the bale stop.

In a third aspect of the present disclosure, an apparatus for removing a binding from a bale is disclosed. The apparatus includes a blade for cutting the binding at a cutting station and a binding removal device for removing the binding from the bale after the binding has been cut by the blade at the cutting station. The binding removal device includes a guide that defines a guide direction and a binding engagement device movable along the guide direction between a first position over the cutting station and a second positon offset from the cutting station. The binding engagement device is configured to engage the binding and includes tines spaced apart along the guide direction so as to define a tine row. The binding engagement device also including hooks spaced apart along the guide direction so as to define a hook row. The hook row is relatively linearly movable relative to the tine row along the guide direction between a binding holding positon and binding receiving/release position.

In a fourth aspect of the present disclosure, a bale processing apparatus is disclosed. The bale processing apparatus includes a conveyor for transporting a bale to a cutting station that includes a cutting blade for cutting a binding of the bale. The bale processing apparatus also includes a binding engagement device having a set of tines and a set of hooks positioned proximate to the set of tines. The set of hooks are configured to move relatively linearly with respect to the set of tines. The binding engagement device is configured to automatically remove a binding from the bale. The bale processing apparatus also includes a binding removal arm extending from the cutting station. The binding removal arm includes a guide that extends along a length of the binding removal arm. The binding removal arm further carries a binding engagement device that is movable within the guide.

In a fifth aspect of the present disclosure, a bale processing apparatus is disclosed. The bale processing apparatus includes a conveyor for transporting the bale to a cutting station. The cutting station includes a cutting blade for cutting a bale binding and a bale during a cutting operation.

The cutting station also includes a support structure for supporting a portion of the bale. The cutting blade and support structure are configured to move the bale to a bale stop structure for the cutting operation. The support structure is configured to move away from the bale when the cutting blade penetrates the bale. The bale processing apparatus also includes a binding removal arm that extends from the cutting station. The binding removal arm includes a guide that extends along a length of the binding removal arm. A binding engagement device, in turn, is movable within the guide and is automatically configured to remove a binding from the bale.

In a sixth aspect of the present disclosure, a method of removing binding from a bale is disclosed. The method includes cutting the binding, removing at least a portion of the weight of the bale from the binding, and removing the binding from the bale.

In a seventh aspect of the present disclosure, a comminuting system is disclosed. The comminuting system includes a movable cutting chamber that includes a support structure for supporting a bale and a cutting blade for cutting the bale and a bale binding. The comminuting system also includes a delivery conveyor that is configured to transport the bale to the cutting chamber. The comminuting system further includes a binding removal device positioned above the cutting chamber. The binding removal device is configured to receive the bale from the cutting chamber and to remove the bale binding therefrom. The comminuting system also includes an exit conveyor that is configured to receive a cut bale and a grinder that is configured to further process the bale into smaller pieces.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
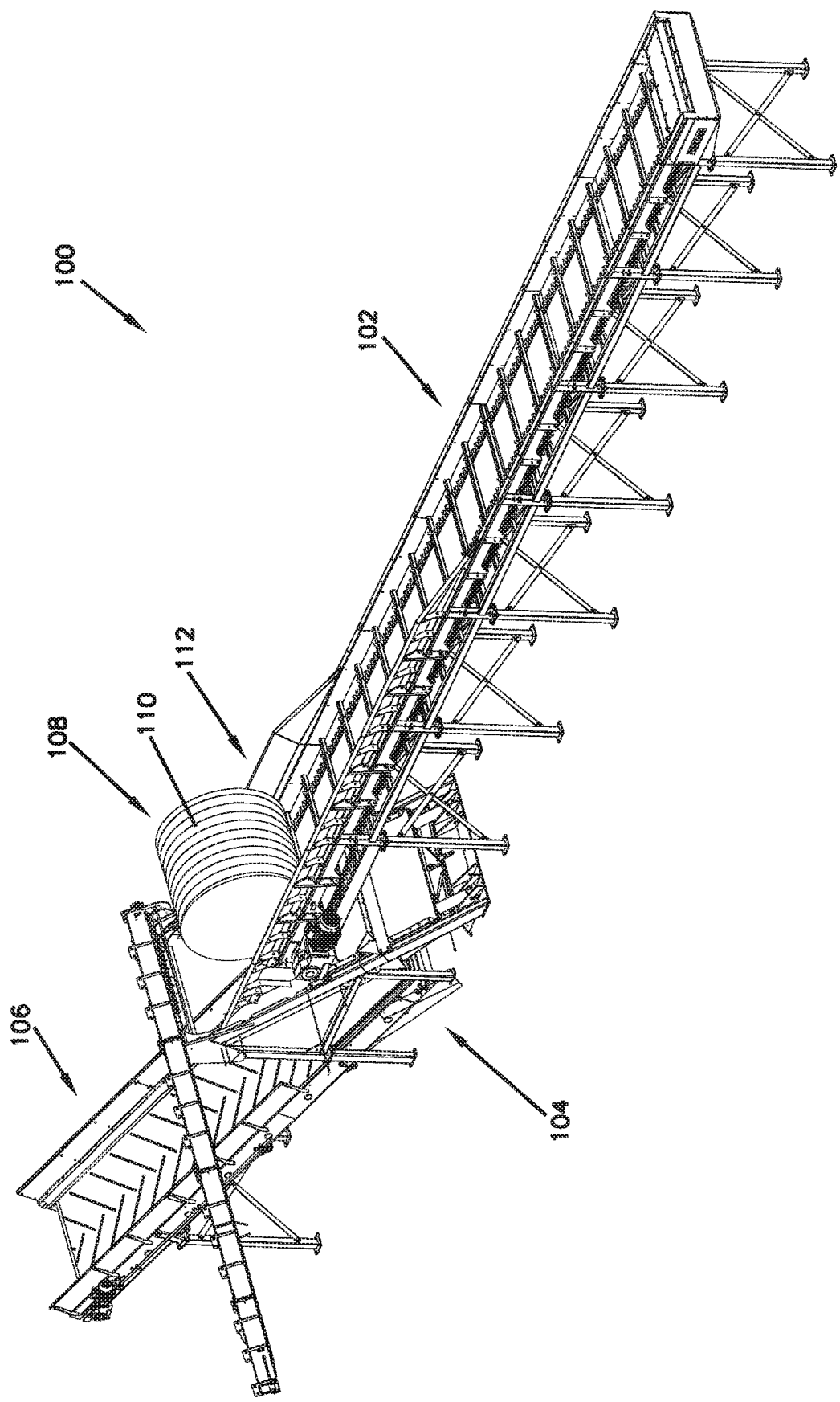
FIG. 1 illustrates a perspective view of a bale processing machine, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The bale processing machine disclosed herein has several advantages. The bale processing machine is configured to process a large number of bales quickly with little downtime. Additionally, the bale processing machine can handle a variety of differently sized bales. During processing, the bale processing machine removes binding quickly and effectively by lifting the bale and removing the weight of the bale from the binding to allow for complete removal of the binding by the machine. Additionally, when lifting the bale, the bale processing machine also processes the bale by separating the bale into separate portions or sections. Such processing creates bale portions that are easier to process by a downstream grinder. Specifically, the bale processing machine disclosed herein is configured to separate the dense core of the bale, which known to be difficult to process by downstream grinders, prior to being received by the grinder downstream.

A bale processing machine 100 is shown in FIG. 1. The bale processing machine 100 includes an infeed conveyor 102, a processing station 104, and an outfeed conveyor 106. The bale processing machine 100 is configured to transport a bale 108 via the infeed conveyor 102 to the processing station 104. At the processing station 104, the bale 108 is cut and separated, and a bale binding 110 is removed from the outside of the bale 108. The bale portions 108a, 108b (FIGS. 15-17) are then deposited onto the outfeed conveyor 106 for further processing or for depositing to a processing area. Such a bale processing machine 100 can be used to process bales 108 for agricultural operations, biomass energy production, or for a variety of other operations that call for the use of deconstructed material that has been stored in bales.

The infeed conveyor 102 is configured to receive a plurality of bales 108 and transport the bales 108 to the processing station 104. The infeed conveyor 102 is depicted as generally horizontal; however, the conveyor can be configured in a variety of different ways so long as controlled delivery of bales 108 to the processing station 104 is achieved. In some embodiments, the bale processing machine 100 may not include an infeed conveyor.

In some embodiments the infeed conveyor 102 includes a sensor (not shown) that provides feedback to a control unit (shown schematically in FIG. 35) that controls the movement of the infeed conveyor 102. The sensor can provide information such as when there is a bale positioned at an end 112 of the conveyor 102. Additionally, the feedback provided to the controller can be combined with sensor feedback from elsewhere on the bale processing machine 100. For example, the controller can use feedback from the infeed conveyor sensor and a sensor located at the processing station that provides feedback as to whether or not a bale is being processed in the processing station 104 to determine if the infeed conveyor 102 should be rotated so as to deliver a bale 108 to the processing station 104. A further sensor (e.g., weight or motion) could be provided at the processing station 104 to confirm the splitting of a given bale 108 and/or the lack of a bale 108 or a portion 108a, 108b thereof at the processing station 104.

The processing station 104 is configured to separate the bale 108 and remove the binding 110 from the exterior of the bale 108. Specifically, the processing station 104 raises the bale 108, secures the binding 110, cuts the bale 108, removes the binding 110, and deposits the cut bale onto the outfeed conveyor 106.

The outfeed conveyor 106 is configured to receive the processed bale after the processing station 104 has cut the bale 108 and removed the binding 110. The outfeed conveyor 106 can be configured to deliver the processed bale to another processing machine, for example, a grinder. In some embodiments, the outfeed conveyor 106 delivers the processed bale to a processed bale storage location.

Figure 2:
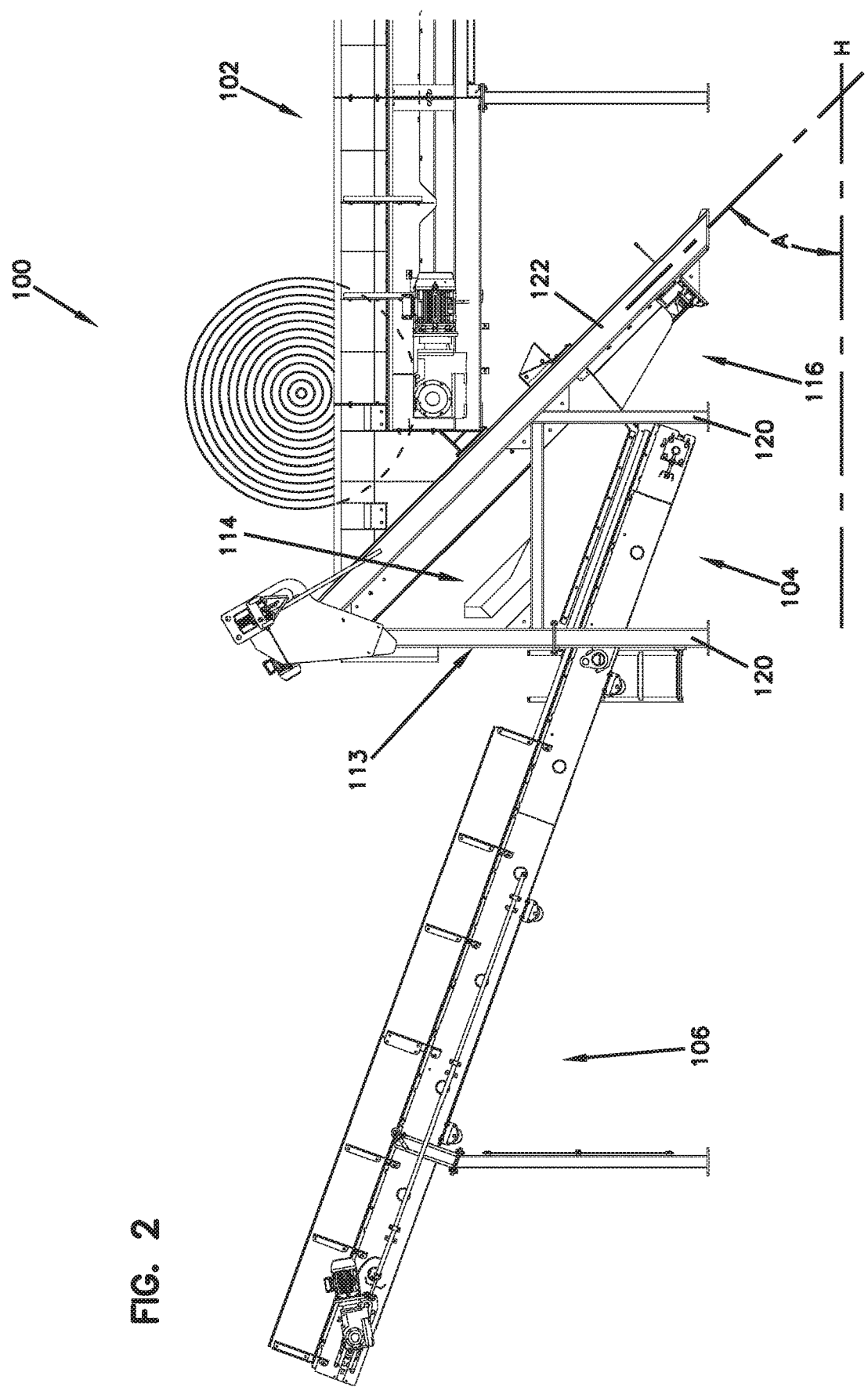
FIG. 2 illustrates a side view of a portion of the bale processing machine of FIG. 1.

FIG. 2 shows a side view of the bale processing machine 100. As shown, the infeed conveyor 102 is configured to deliver a bale 108 from an elevated position to the processing station 104. The processing station 104 is shown to include a frame 113, a bale support 114, and cutting mechanism 116.

The frame 113 is configured to support the processing station 104 with a plurality of legs 120. The frame 113 includes a track member 122 that is configured to provide a guide for the cutting mechanism 116 during a cutting operation. In some embodiments, the track member 122 is orientated at an angle A with horizontal H. In some embodiments, the track member 122 is orientated between about a 0-degree angle and about a 90-degree angle with horizontal H. In other embodiments, the track member 122 is orientated between about a 30-degree angle and about a 60-degree angle. By angling the track member 122, the cutting mechanism 116 can penetrate the bale 108 at an angle, thereby promoting the natural separation of the bale. The natural separation is due to the tendency of the cut bale portions 108a, 108b (FIGS. 15-17) to fall down and away from each other thanks to gravity.

The bale support 114 is configured to receive and support the bale 108 when the bale 108 is introduced to the processing station 104 from the infeed conveyor 102. In some embodiments, the bale support 114 cradles the bale 108 within the processing station 104 until the cutting operation is complete. In some embodiments, the bale support 114 is movable with the cutting mechanism 116 between a lowered position and a raised position during the cutting operation. In still other embodiments, the bale support 114 is rigidly attached to the cutting mechanism 116.

The cutting mechanism 116 is configured to travel along the track member 122 of the frame 113 during a cutting operation. Specifically, the cutting mechanism 116 is movable along the track member 122 of the frame 113 of the processing station 104 between a retracted, or lowered, position (as shown in FIG. 2) and an extended, or raised, position (as shown schematically in FIG. 14). During the movement of the cutting mechanism 116, the cutting mechanism 116 is configured to penetrate both the bale 108 and binding 110 during the cutting operation.

Figure 3:
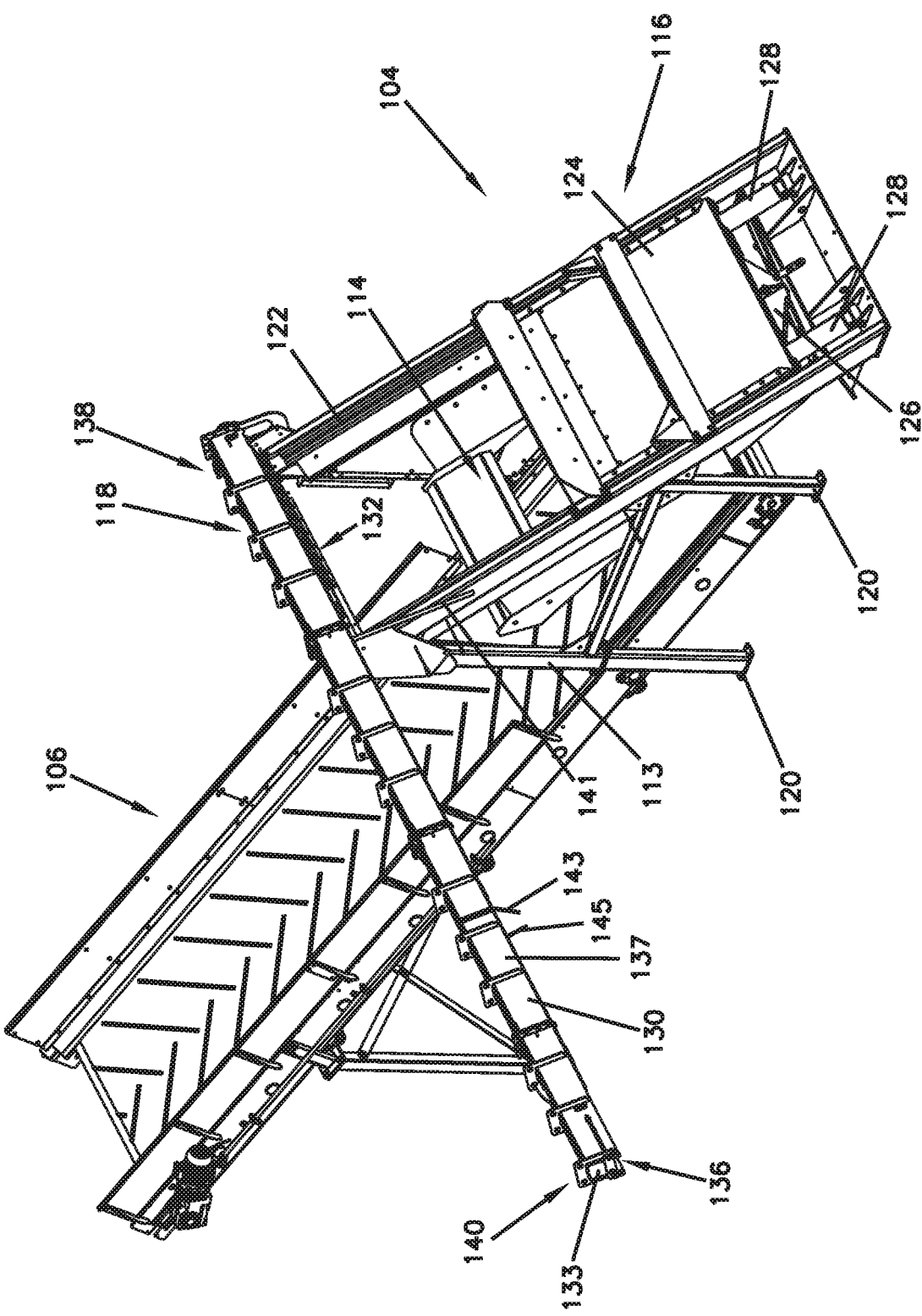
FIG. 3 illustrates a rear perspective view of the bale processing machine of FIG. 1 without an infeed conveyor.
Figure 4:
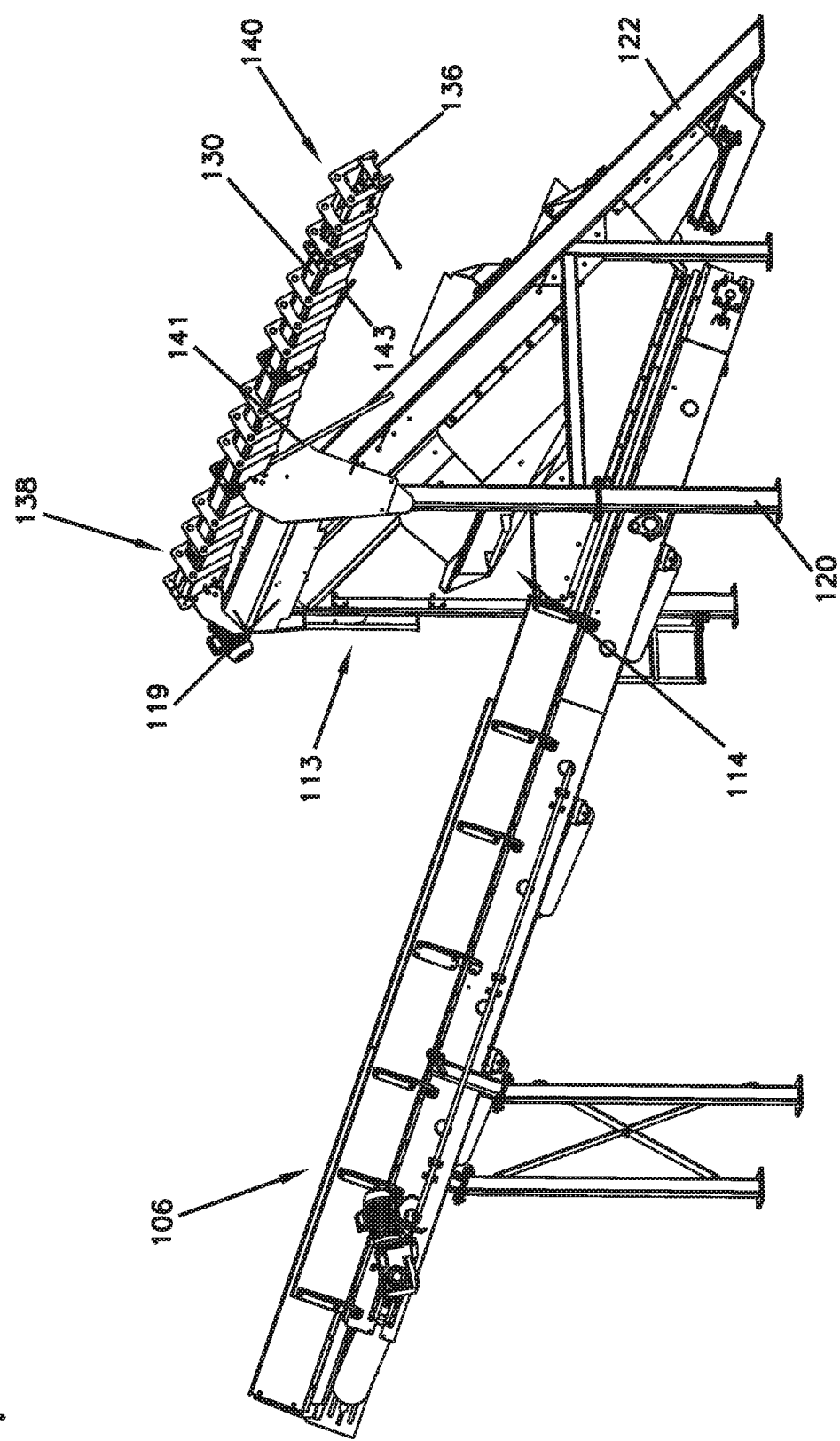
FIG. 4 illustrates a front perspective view of the bale processing machine of FIG. 1 without an infeed conveyor.

FIGS. 3-4 show the bale processing machine 100 without the infeed conveyor 102. The processing station 104 is shown to include the frame 113, the bale support 114, the cutting mechanism 116, and a binding removal device 118. The bale support 114 and the cutting mechanism 116 are configured to transport the bale 108 to the binding removal device 118 during the cutting operation.

The frame 113 is shown to include a bale stop 119 (shown in FIG. 4). The bale stop 119 is configured to receive the bale 108 when the bale 108 is transported to the binding removal device 118 by the bale support 114 and the cutting mechanism 116. The bale stop 119 prevents the continued raising of the bale 108 during the cutting operation and allows the cutting mechanism 116 to continue traveling upward along the track member 122 and into the bale to complete a cutting operation. Additionally, the bale stop 119 is positioned on the frame 113 so that the bale support 114 can travel past, or behind, the bale stop 119.

The binding removal device 118 is attached to an upper portion of the frame 113 and is configured to remove the binding 110 from the bale 108. The binding removal device is configured to interact with at least the upper half of the circumference of the bale 108, with respect to horizontal. In the depicted embodiment, the binding removal device 118 is configured to interact with the bale 108 near the top of the bale, with respect to horizontal. The binding removal device 118 includes a binding removal arm 130 and a binding engagement device 132. The binding removal device 118, specifically the binding engagement device 132, is configured to engage the bale 108 and secure to and remove the binding 110 from the bale 108. After securing to the binding 110, the binding engagement device 132 travels along a guide 136 that is disposed along the length of the binding removal arm 130. In some embodiments, the guide 136 may, in part, define a guide slot 133 through which a portion of the binding engagement device 132 may extend.

The binding removal arm 130 is configured to transport the binding 110 that has been removed from the bale 108. The binding removal arm 130 has an engaging end 138 and a disengaging end 140. The engaging end 138 is positioned generally above the cutting mechanism 116 and the bale support 114. The disengaging end 140 is positioned in an offset position from the cutting mechanism 116 and the bale support 114. The guide 136 travels the length of the binding removal arm 130 from the engaging end 138 to the disengaging end 140. In some embodiments, the binding removal arm 130 is configured to transport the binding 110 from the engaging end 138 to the disengaging end 140. In the depicted embodiment, the binding removal arm 130 includes a shroud 137 that partially surrounds the guide 136 and internal components of the binding removal device 118 that operate the binding engagement device 132 (shown with more detail in FIG. 10).

The binding removal arm 130 also includes a guide bar 141 and a pair of guide fingers 143, 145. The guide bar 141 is positioned on the binding removal arm 130 and is configured to aid in preventing the binding 110 from catching on any portion of the processing station 104. In the depicted embodiment, the guide bar is substantially straight and without bends The guide fingers 143, 145 are positioned on the binding removal arm 130 and help to guide the binding 110 when the binding 110 travels along the binding removal arm 130. In some embodiments, the guide fingers 143, 145 are separately spaced along the binding removal arm 130. In some embodiments, the guide fingers 143, 145 may be separated by at least a foot. In other embodiments, the guide fingers 143, 145 are spaced from one another along the binding removal arm 130 at a distance that is greater than the width of the binding 110 that is removed from the bale, so as to prevent tangling. By spacing the guide fingers 143, 145 along the binding removal arm 130, it is less likely that the binding 110 become tangled in both guide fingers 143, 145. The guide fingers 143, 145 are angled toward center of the binding removal arm 130 and angled in a direction toward the ground. In some embodiments, the guide fingers 143, 145 are also angled in a direction toward the disengaging end 140 of the binding removal arm 130. When angled toward the disengaging end, it is less likely that that binding 110 will catch on the guide fingers 143, 145 when traveling along the binding removal arm 130.

The guide fingers 143, 145 help to retain the binding 110 on the binding removal arm when the binding travels from the engaging end 138 to the disengaging end 140. Alternatively, the guide fingers 143, 145 also provide another way of removing the binding 110 from the binding engagement device 132 when the binding engagement device 132 is traveling back in a direction toward the engaging end 138 of the binding removal arm 130. Ideally, the binding 110 temporarily catches on the guide fingers 143, 145 when moving in a direction toward the engaging end 138 and then immediately falls to the ground. In some embodiments, a single finger 143 or 145 may be used.

Also shown in FIGS. 3-4 is the cutting mechanism 116. The cutting mechanism 116 includes a shroud 124 that surrounds a blade 126 when the cutting mechanism 116 is in the retracted position. The cutting mechanism 116, in the version illustrated, also includes a pair of actuators 128 connected to the cutting blade 126. The actuators 128 are movable so as to move the cutting mechanism 116, specifically the cutting blade 126, between the retracted position and the extended position. In some embodiments, the actuators 128 are hydraulic actuators. As the cutting mechanism 116 is moved along the track member 122 of the frame 113, the bale support 114 simultaneously supports at least a portion of the weight of the bale 108.

When the bale 108 is raised to a height where it contacts the bale stop 119, the bale support 114 and cutting mechanism 116 continue to travel in an upward direction, while the bale 108 stays generally stationary against the bale stop 119. Simultaneously, the binding removal device 118 secures the binding 110 of the bale 108. As the cutting mechanism 116 penetrates the bale 108 and the binding 110, the bale support 114 continues moving past the bale stop 119, so as to no longer support the weight of the bale 108. Once the cutting mechanism 116 has penetrated the binding 110 and the bale 108 through a desired percentage of the overall thickness of the bale 108, the cutting mechanism 116 is reversed and begins travel downward along the track member 122 of the frame 113 in a direction toward the retracted position. At such a time, a portion 108a (e.g., 40-60% thereof) of the bale 108 falls onto the outfeed conveyor 106, and a portion 108b of the bale 108 rests on a top side of the blade 126. As the cutting mechanism 116 continues to move downward on the track member 122, the portion 108b of the bale 108 that was resting on a top side of the cutting blade 126 eventually falls off of the cutting blade 126, past the bale support 114, and onto the outfeed conveyor 106. The cutting mechanism 116 and bale support 114 continue to move downward until they are both back in the lowered positioned. This cutting process is described schematically with respect to FIGS. 11-17.

Figure 5:
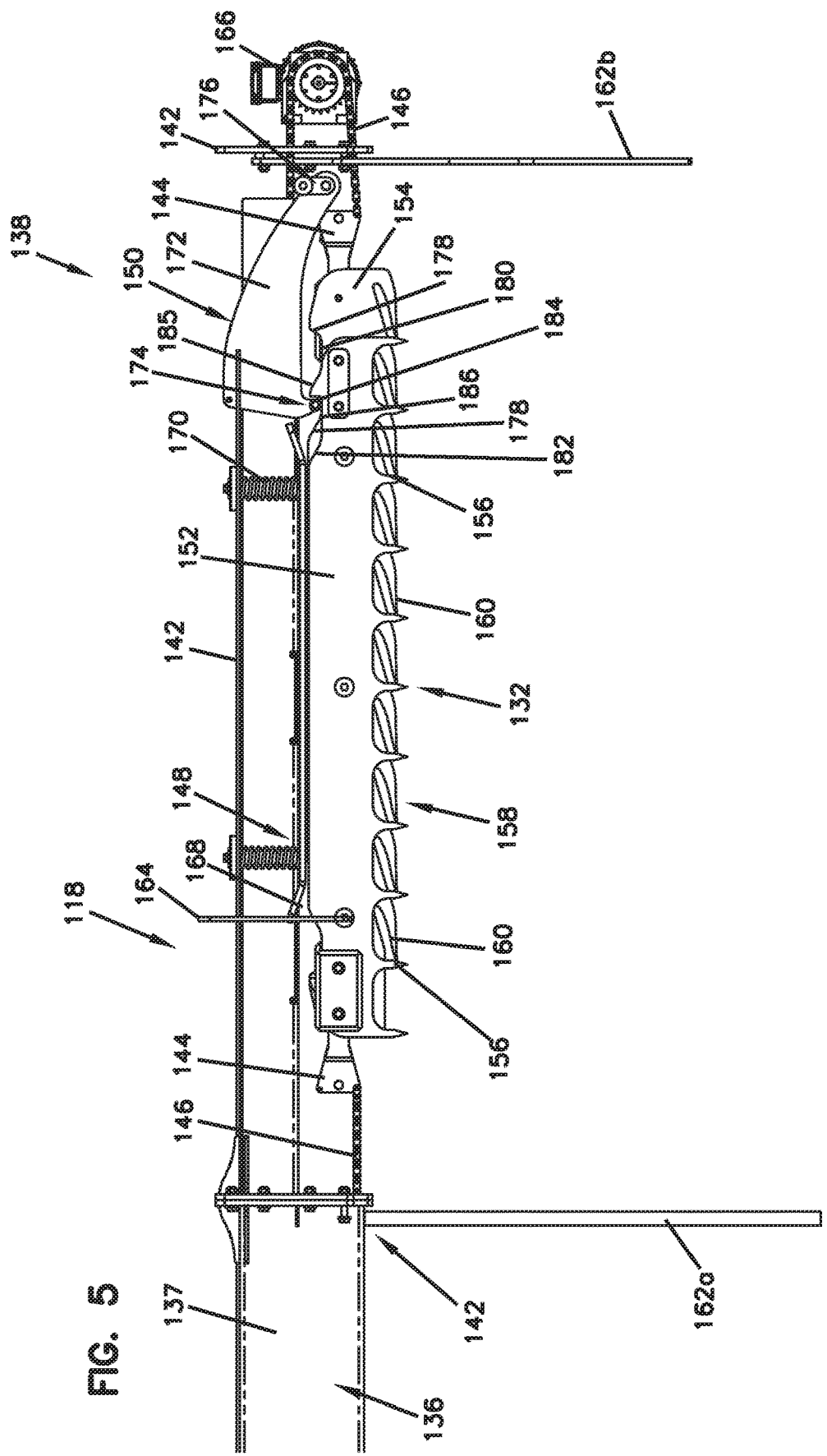
FIG. 5 illustrates a front view of an engaging end of a binding removal device in the binding receiving/release position, according to one embodiment of the present disclosure.

FIGS. 5-10 show the binding removal device 118 in different positions that correspond with different steps of the cutting operation. FIG. 5 shows the engaging end 138 of the binding removal arm 130. The binding removal device 118, specifically the binding removal arm 130, is shown with a portion of the shroud 137 removed. As shown, the binding removal device 118 includes the binding engagement device 132, a binding removal arm frame 142, a pair of coupling elements 144, a chain 146, an impact protector 148, and an engaging end pawl 150. The binding engagement device 132 is mounted to the pair of coupling elements 144, which are mounted to the chain 146. The coupling elements 144 and binding engagement device 132 are movable along the binding removal arm 130 by way of the chain 146.

The binding engagement device 132 includes a tine plate 152 and a hook plate 154. The tine plate 152 includes a plurality of individual tines 156 spaced apart along the length of the tine plate 152 so as to define a set of tines in a tine row. In some embodiments, the tines 156 are pointed and are configured to enter the bale 108 and anchor the binding 110 to the bale 108.

The hook plate 154 includes a plurality of individual hooks 158 and is movably mounted with respect to the tine plate 152. In some embodiments, the hook plate 154 is linearly movable relative to the tine row of the tine plate 152 between a binding holding positon and a binding receiving/release position. In FIG. 5, the hook plate 154 and the tine plate 152 are shown in the binding receiving/release position. Also, in the depicted embodiment, the hooks 158 include fingers 160 that are oriented next to the tines 156. The amount of hooks 158 included on the hook plate 154 can range depending on the size of the hooks 158 and the size of the hook plate 154. It is contemplated that the hook plate 154 may contain more or less hooks 158 and related tines 156 than depicted in the FIGS. In some embodiments, the hook plate 154 can contain a single hook 158.

The binding removal arm frame 142 is shown to include a pair of mounting plates 162a, 162b that are configured to mount the binding removal device 118 to the processing station 104. In some embodiments, the mounting plates 162a, 162b can be of different sizes and shapes. In some embodiments, the binding removal arm frame 142 includes a plurality of cross members 164 that are positioned along the length of the binding removal arm 130.

Also shown in FIG. 5, the pair of coupling elements 144 are attached to the chain 146 and the binding engagement device 132 and are configured to carry the binding engagement device 132 between a first and a second position. The first position corresponds to positioning the binding engagement device 132 near the engaging end 138 of the binding removal arm 130. The coupling elements 144 are shown in the first position in FIG. 5. The second position corresponds to positioning the binding engagement device 132 near the disengaging end 140 of the binding removal arm 130. Specifically, the coupling elements 144 are attached to the hook plate 154 of the binding engagement device 132.

The chain 146 is shown disposed along the length of the binding removal arm 130. In some embodiments, the chain 146 is driven by a motor 166. The chain 146 is configured to travel within the guide 136 of the binding removal arm 130. In some embodiments, the chain 146 can be a belt or a cable.

The impact protector 148 is positioned above the binding engagement device 132. The impact protector 148 is configured to prevent the binding engagement device 132 from impacting parts of the binding removal arm 130, thereby helping to prevent damage to the binding engagement device 132. The impact protector 148 includes a bar 168 that is connected to a pair of spring loaded arms 170. The spring loaded arms 170 are attached to the binding removal arm frame 142. The bar 168 and spring loaded arms 170 are configured to receive the binding engagement device 132 when the binding engagement device 132 is impacted by the bale 108. The spring loaded arms 170 act to cushion the movement of the binding engagement device 132 in a direction that is generally perpendicular to the binding removal arm 130.

As shown in FIG. 5, the engaging end pawl 150 is configured to facilitate movement between the tine plate 152 and the hook plate 154. The engaging end pawl 150 includes a body 172, a free end 174, and a fixed end 176. The free end 174 is configured to the make contact with the tine plate 152 and the hook plate 154 during the cutting operation so as to facilitate a sliding motion between the two, respectively. The fixed end 176 is pivotally connected to the binding removal arm 130 so as to allow the body 172 and free end 174 to pivot about the fixed end 176.

The hook plate 154 and the tine plate 152 include a plurality of surfaces that enable the engaging end pawl 150 to aid in movement of the hook plate 154 and tine plate 152. Specifically, the hook plate 154 includes a pair of opposing ramped surfaces 178 that define a pocket 180 at either end of the hook plate 154. Additionally, the tine plate 152 includes a ramped surface 182 and a lip 184 that define a pocket 186 at either end of the tine plate 152. As shown, the lip 184 also includes a ramped back surface 185. As shown in FIGS. 5-10, the free end 174 of engaging end pawl 150 is configured to ride within the pockets 180, 186, ride up and down the ramped surfaces 178,182, and catch on the lip 184 of the tine plate 152.

As shown in FIG. 5, the binding engagement device 132 is in the binding receiving/release position and prepared to receive a bale 108 from the bale support 114 and cutting mechanism 116. In this position, free end 174 of the engaging end pawl 150 is caught on the lip 184 and riding within the pockets 180, 186.

At the start of the cutting operation, once the bale 108 contacts the binding engagement device 132, the tines 156 penetrate a portion of the bale 108 as the binding engagement device 132 is in the receiving/release position. Shortly after the tines are positioned within the bale, the binding engagement device 132 is moved from the binding receiving/release position to the binding holding positon.

Figure 6:
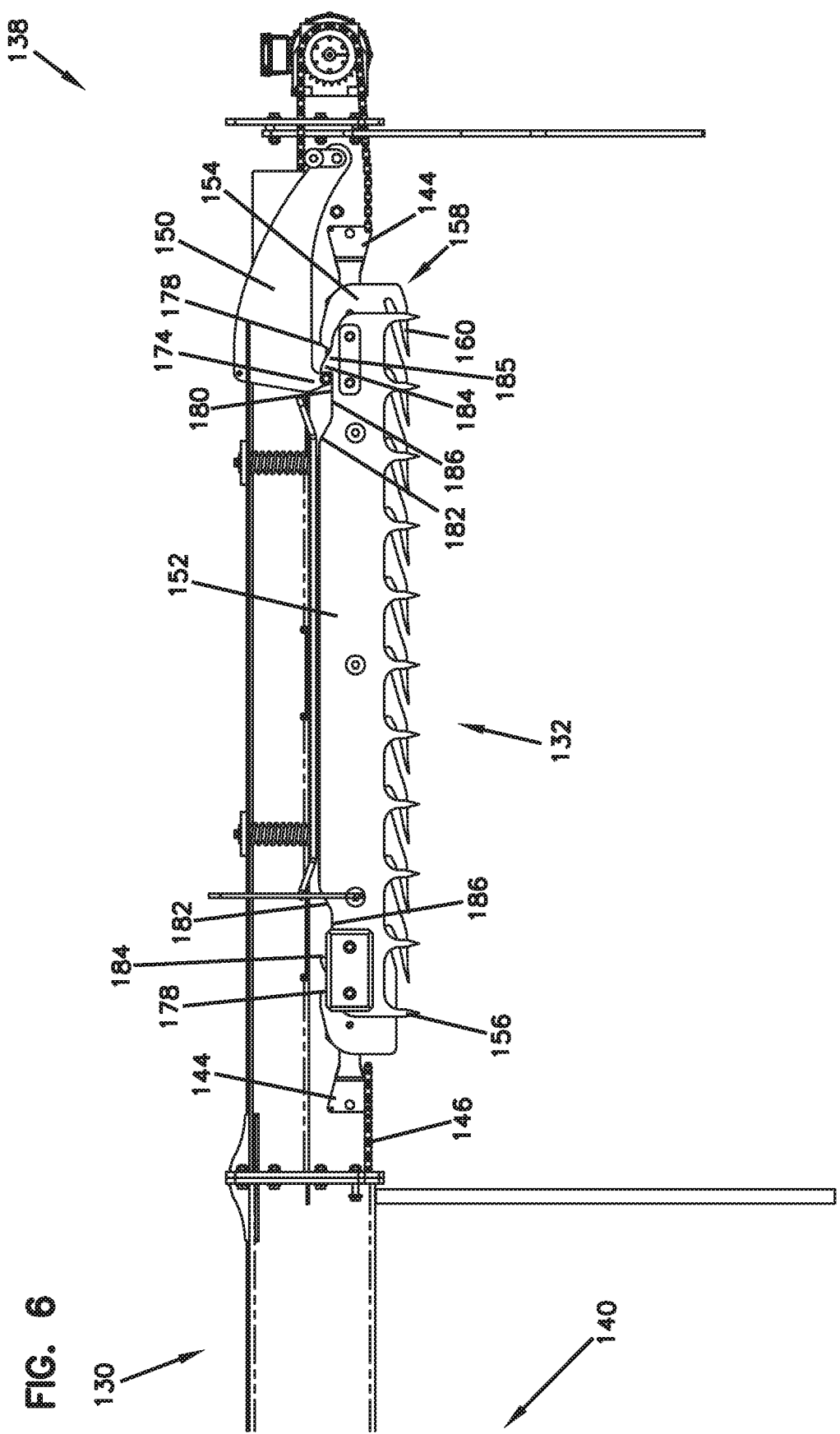
FIG. 6 illustrates a front view of the engaging end of the binding removal device between the binding receiving/release position and a binding holding position.

When the binding engagement device 132 moves from the binding receiving/release position to the binding holding positon, the hook plate 154 moves relative to the tine plate 152, as shown in FIG. 6. Movement of the hook plate 154 is facilitated by way of the chain 146 that is attached to the coupling elements 144 that are attached to the hook plate 154. The chain 146 begins to move the hook plate 154 along the binding removal arm 130 in a direction toward the disengaging end 140 of the binding removal arm 130. Such movement of the hook plate 154 causes the hooks 158, specifically the fingers 160, to move next to the tines 156. During this movement, the tine plate 152, specifically the tines 156, stay in a generally stationary position with respect to the bale 108. As the hook plate 154 moves next to the tine plate 152, the hooks 158 travel across the surface of the bale 108 and underneath the binding 110. The fingers 160 of the hooks 158 begin to guide the binding 110 onto the hooks 158.

With continued reference to FIG. 6, the free end 174 of the engaging end pawl 150 is shown to remain caught on the lip 184 of the tine plate 152. As the hook plate 154 moves, the free end 174 travels within the pocket 180 of the hook plate 154. The free end 174 is configured to aid in holding the tine plate 152 in a generally stationary position as the hook plate 154 is moved. This is accomplished by the free end 174 resisting the movement of the tine plate 152 by resting against the lip 184.

Figure 7:
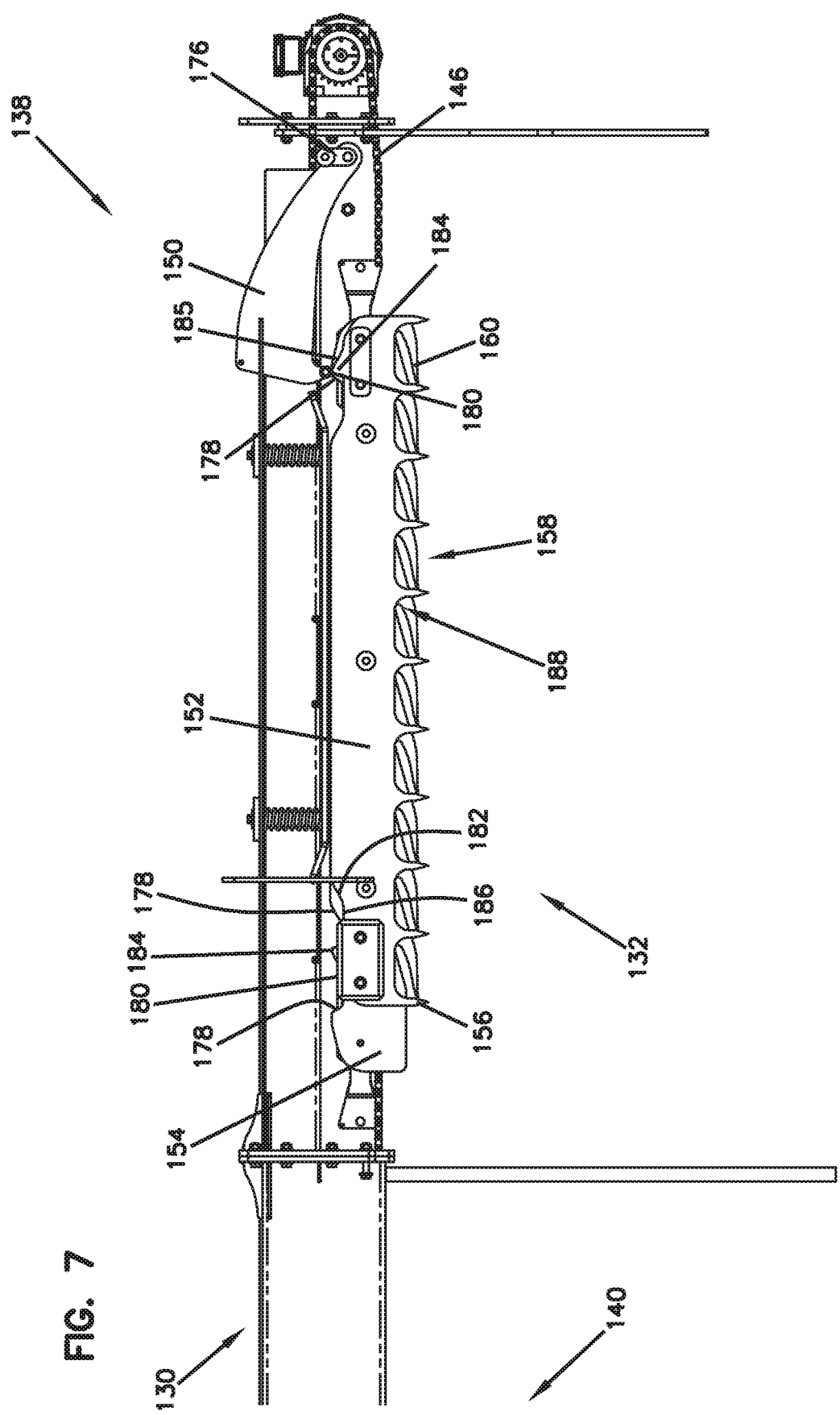
FIG. 7 illustrates a front view of the engaging end of the binding removal device in the binding holding position.
Figure 8:
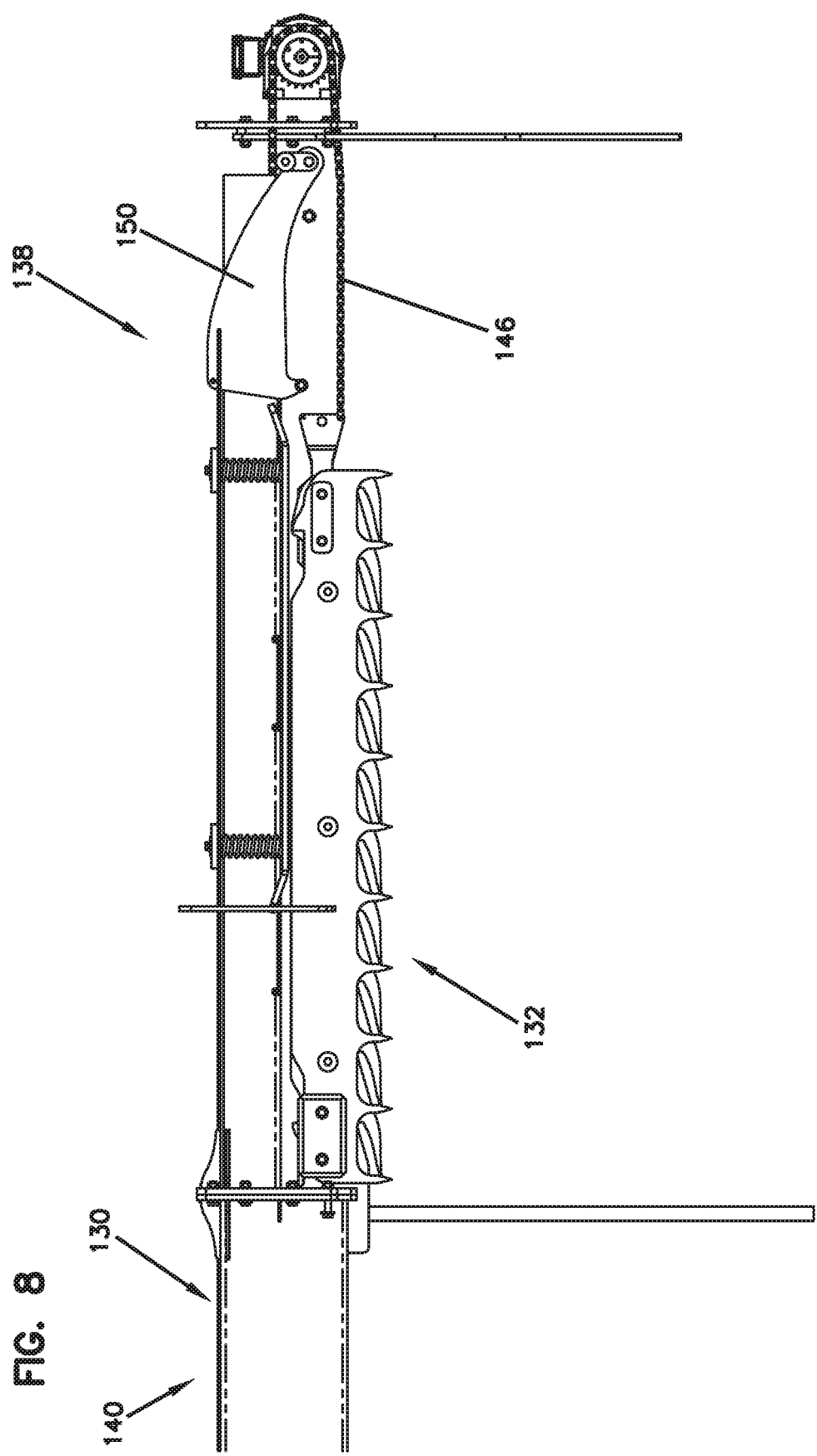
FIG. 8 illustrates a front view of the engaging end of the binding removal device in the binding holding position when a binding engagement device is disengaged with a disengaging end pawl.

FIGS. 7-8 show the binding engagement device 132 in the binding holding positon. In this position, the binding engagement device 132 is configured to hold the binding 110 in binding retaining pockets 188 defined by the tines 156 and hooks 158. It is advantageous to have a plurality of pockets 188 along the binding engagement device 132, as the binding 110 is less likely to tear away from the binding engagement device 132 during removal. In some embodiments, the pockets 188 are in a closed position when the binding engagement device 132 is in the binding holding position and an open position when the binding engagement device 132 is in the binding receiving/release position. When in the closed position, the binding 110 is secured within the plurality of pockets 188.

The free end 174 of the engaging end pawl 150 is shown rotated about the fixed end 176. Specifically, the free end 174 is shown resting outside of the hook plate pocket 180. When moving to the binding holding position, the hook plate 154 continues to move in a direction toward the disengaging end 140 of the binding removal arm 130. During such movement, the free end 174 travels within the hook plate pocket 180 until contacting the ramped surface 178 of the hook plate 154. At such a time, the free end 174 travels up the ramped surface 178, which simultaneously allows the free end 174 to rise above the lip 184, thereby releasing the tine plate 152. This position is shown in FIG. 7. Due to this positioning, the chain 146 is configured to move the tine plate 152 and hook plate 154 in the binding holding position along the binding removal arm 130 in a direction toward the disengaging end 140. As the binding engagement device 132 travels along the binding removal arm 130, the binding engagement device 132 eventually disengages from the engaging end pawl 150, as shown in FIG. 8.

Figure 9:
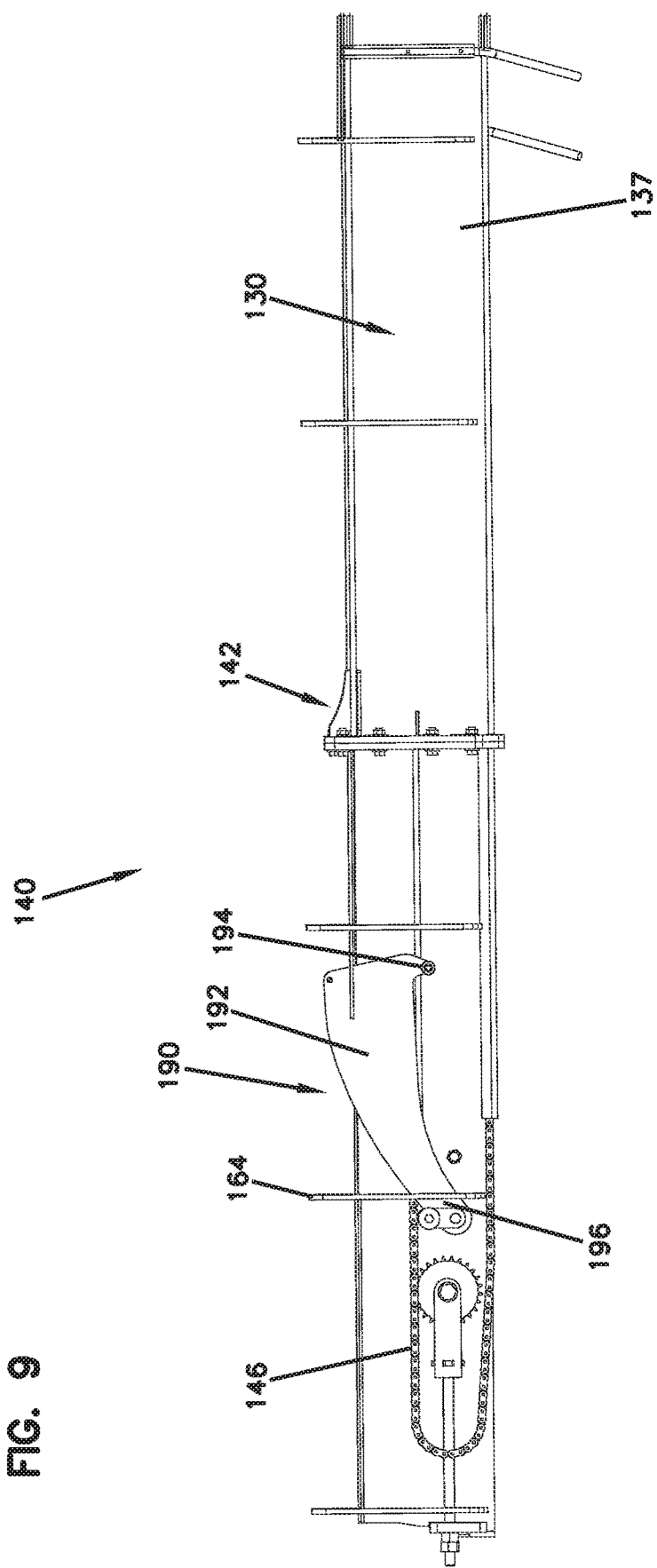
FIG. 9 illustrates a front view of a disengaging end of the binding removal device.

The binding engagement device 132 is configured to travel along the binding removal arm 130, specifically within the guide 136, while holding the binding 110 that has been removed from the bale 108. When the binding engagement device 132 reaches the disengaging end 140 of the binding removal arm 130, as shown in FIG. 9, the binding engagement device 132 encounters a disengaging end pawl 190, which is substantially similar to the engaging end pawl 150. The disengaging end pawl 190 includes a body 192, a free end 194, and a fixed end 196. Because the hook plate 154 includes identical opposing ramped surfaces 178 and identical pockets 180 at either end of the hook plate 154, and the tine plate 152 includes an identical ramped surface 182, lip 184, and pocket 186 at either end of the tine plate 152, the disengaging end pawl 190 interacts with the binding engagement device 132 in a similar way to that of the engaging end pawl 150. However, the disengaging end pawl 190 is configured to move the binding engagement device 132 from the binding holding position to the binding receiving/release position. When moving from the binding holding position to the binding receiving/release position at the disengaging end 140, the binding engagement device 132 is configured to release the binding 110.

When the binding engagement device 132 reaches the disengaging end 140, the hook plate 154 first engages with the free end 194 of the disengaging end pawl 190. As the binding engagement device 132 continues to move in a direction toward the disengaging end 140, the free end 194 rides within the pocket 180 of the hook plate 154 until it encounters the ramped back surface 185 of the lip 184 of the tine plate 152. The free end 194 then rides up the ramped back surface 185, which partially rotates the disengaged end pawl 190 about the fixed end 196. Simultaneously, the free end 194 is also momentarily lifted from contact with the hook plate pocket 180. As the binding engagement device 132 continues to move, the free end 194 rides down the lip 184 of the tine plate 152 and comes to rest within the tine plate pocket 186 and the hook plate pocket 180.

When the free end 194 of the disengaging end pawl 190 is resting within the pockets 186, 180 of the tine plate 152 and hook plate 154, respectively, the movement of the binding engagement device 132 is ceased by the chain 146. The movement of the binding engagement device 132 is then reversed by the chain 146 so that the binding engagement device 132, specifically the hook plate 154 initially, begins moving in a direction toward the engaging end 138 of the binding removal arm 130. Similar to the engaging end pawl 150, the disengaging end pawl 190 holds the tine plate 152 stationary as the hook plate 154 moves next to the tine plate 152. Such movement of the hook plate 154 causes the binding 110 secured within the pockets 188 of the binding engagement device 132 to be released. Specifically, as the hook plate 154 moves next to the stationary tine plate 152, and the tines 156 are configured to release the binding 110 from the fingers 160 of the hooks 158. Such a removal process decreases chances of the binding getting caught within the binding engagement device 132 as the tines 156 are used to actively push the binding from the fingers 160 due to the proximity of the tines 156 and the hooks 158 (as shown in FIG. 10).

Once the binding engagement device 132 has moved into the binding receiving/release position, the free end 194 of the disengaging end pawl 190 rides up the ramp 178 of the hook plate 154 and releases the tine plate 152 for movement. Once released, the binding engagement device 132 returns back to the engaging end 138 of the binding removal arm 130 in preparation for attachment to a binding of a new bale.

Figure 10:
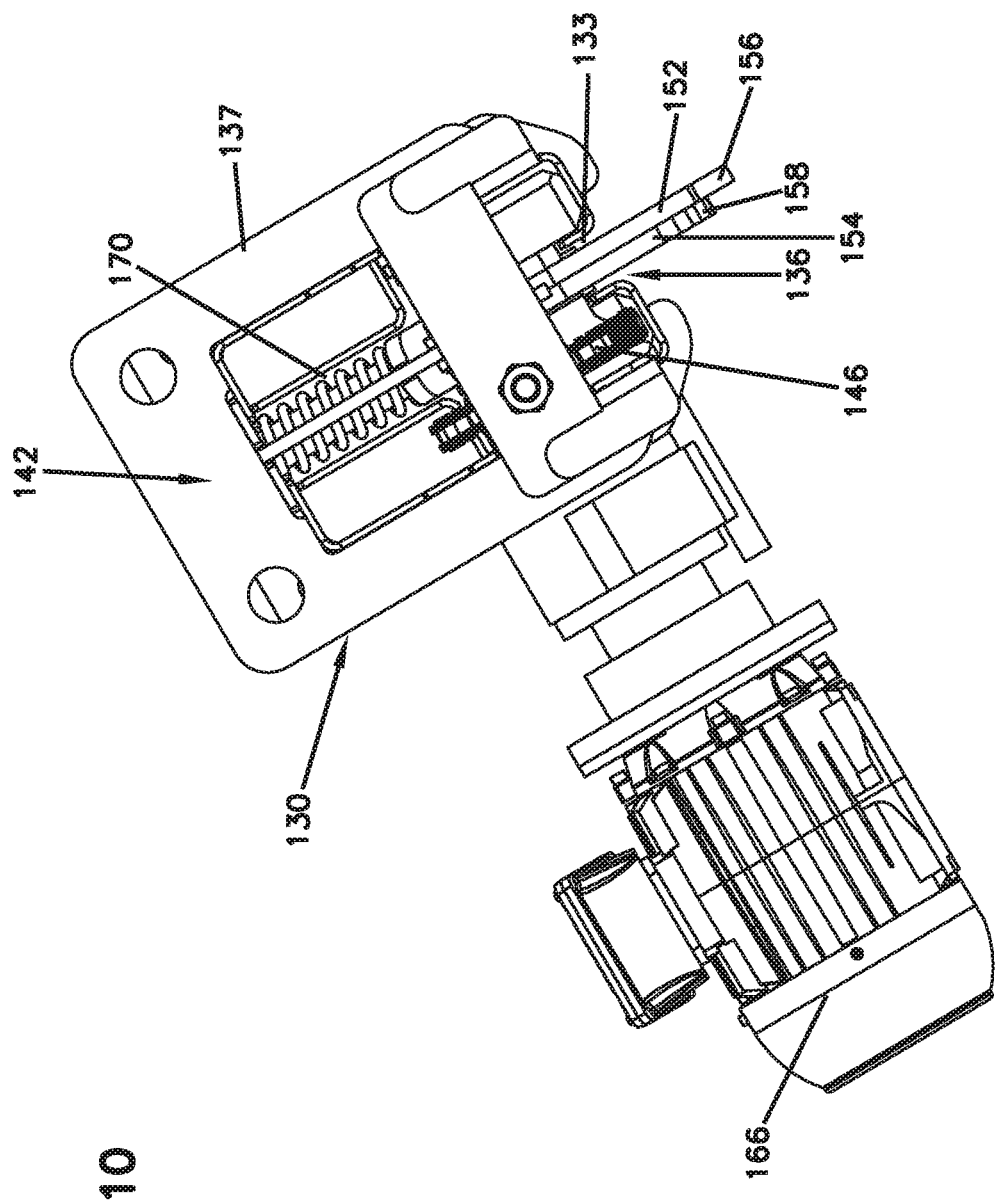
FIG. 10 illustrates an end view of the binding removal device.

FIG. 10 shows an end view of the binding removal arm 130 from the disengaging end 140. As shown, the tine plate 152 and hook plate 154 are positioned in close proximity to one another positioned along the guide 136, and within the guide slot 133. In some embodiments, the tine plate 152 and the hook plate 154 are slidably attached relative to one another.

Figure 11:
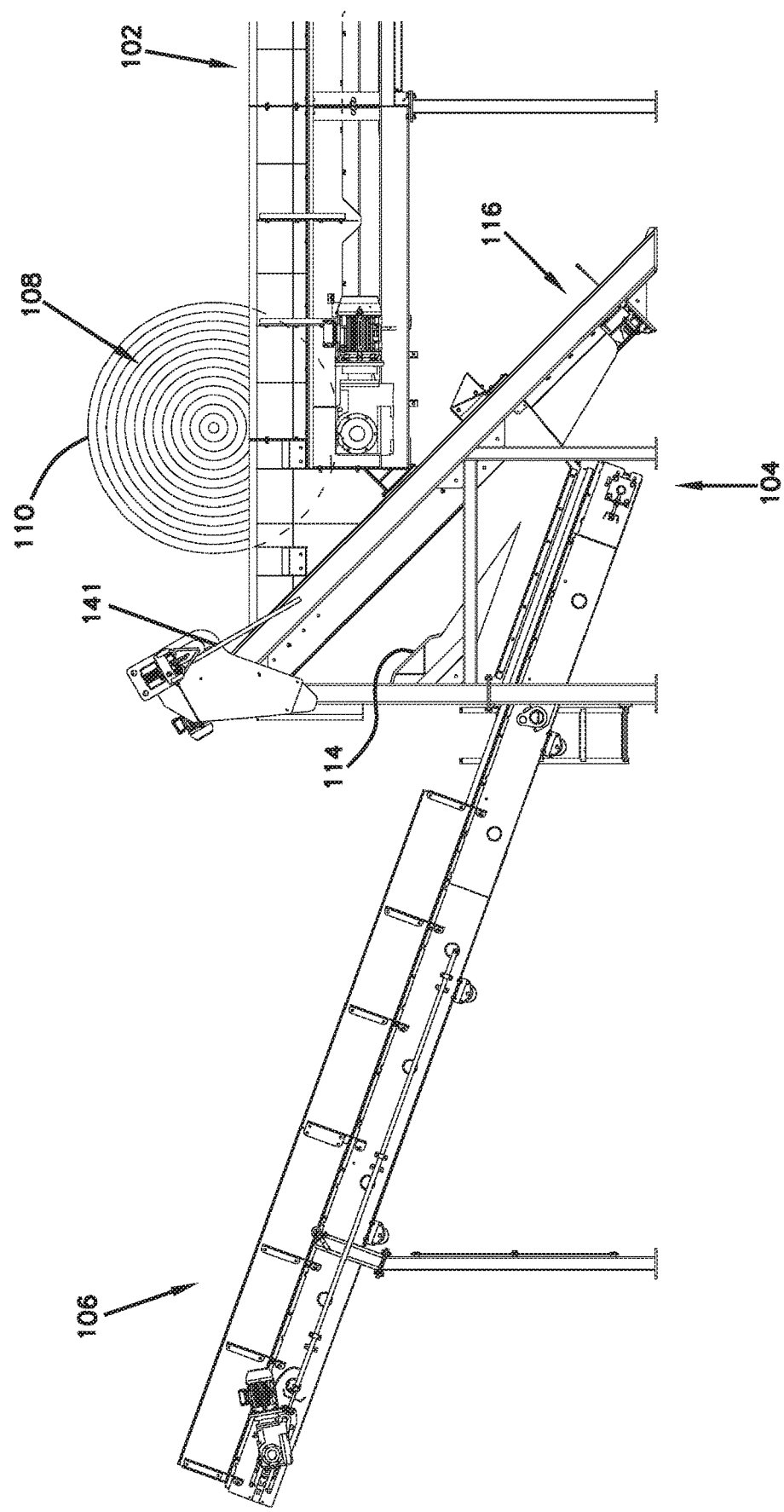
FIG. 11 illustrates a side view of the bale processing machine at the start of a cutting process.
Figure 12:
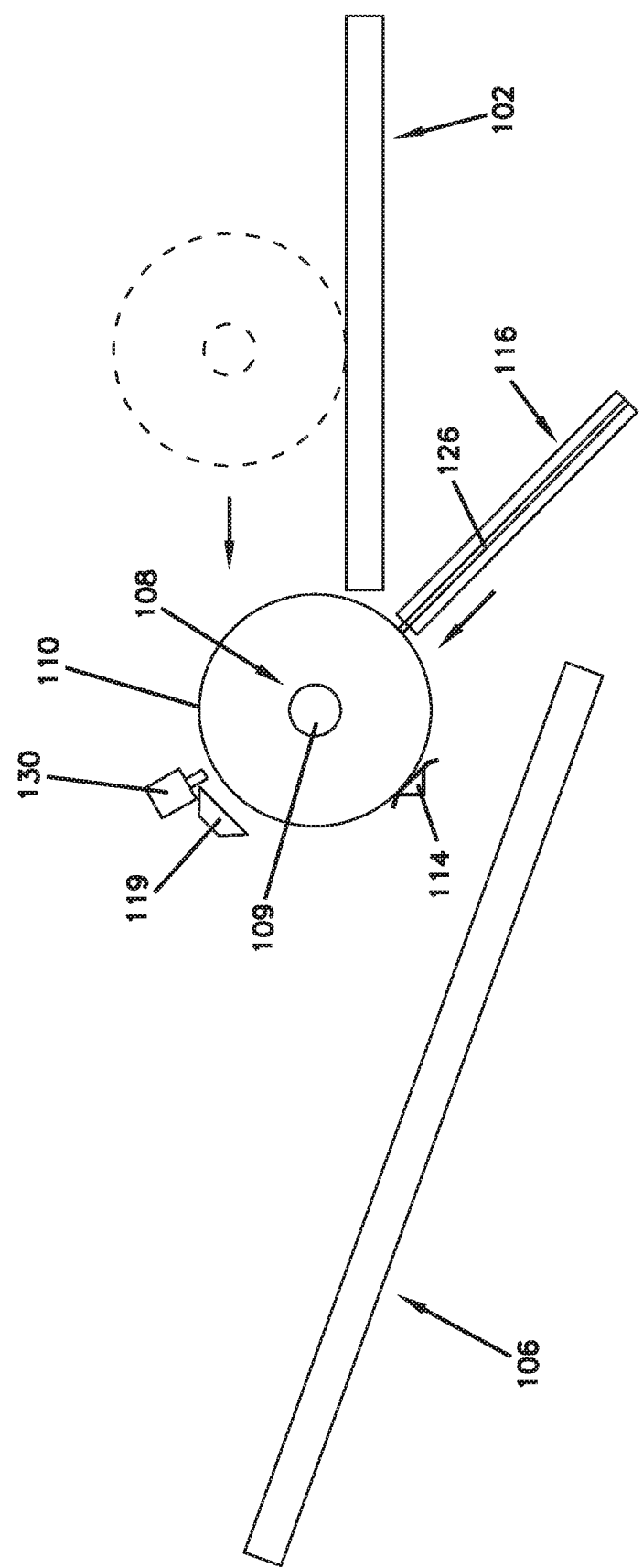
FIGS. 12-15 illustrate a schematic progression of the cutting process of the bale processing machine.

FIGS. 11-16 schematically show the cutting process with respect to portions of the of the bale processing machine 100. FIG. 11 shows the bale 108 on the infeed conveyor 102 in preparation for the cutting process. The cutting mechanism 116 and bale support 114 are depicted in the lowered position, and the binding engagement device 132 is positioned over the processing station 104 at the engaging end 138 of the binding removal arm 130. The infeed conveyer 102 is then operated to move in a direction toward the processing station 104, thereby depositing the bale 108 into the processing station 108, as shown schematically in FIG. 12. The bale 108 rests on the bale support 114 and cutting mechanism 116.

Figure 13:
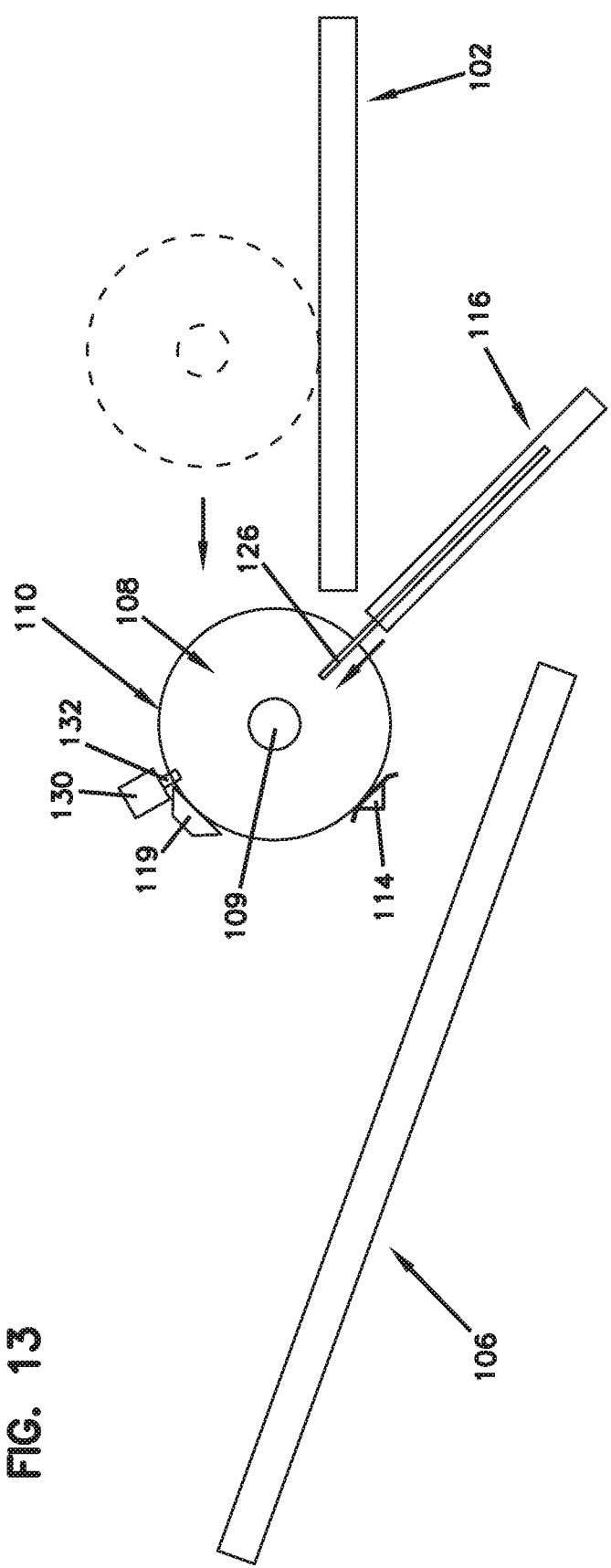

FIG. 13 shows a schematic side view of the bale processing machine 100. As shown, the cutting mechanism 116 is positioned between the retracted position and extended position. The bale is shown making contact with the bale stop 119. Additionally, the bale is shown engaged with the binding engagement device 132. Specifically, at this point in the cutting process, the tines 156 of the tine plate 152 are inserted into the bale 108.

Figure 14:
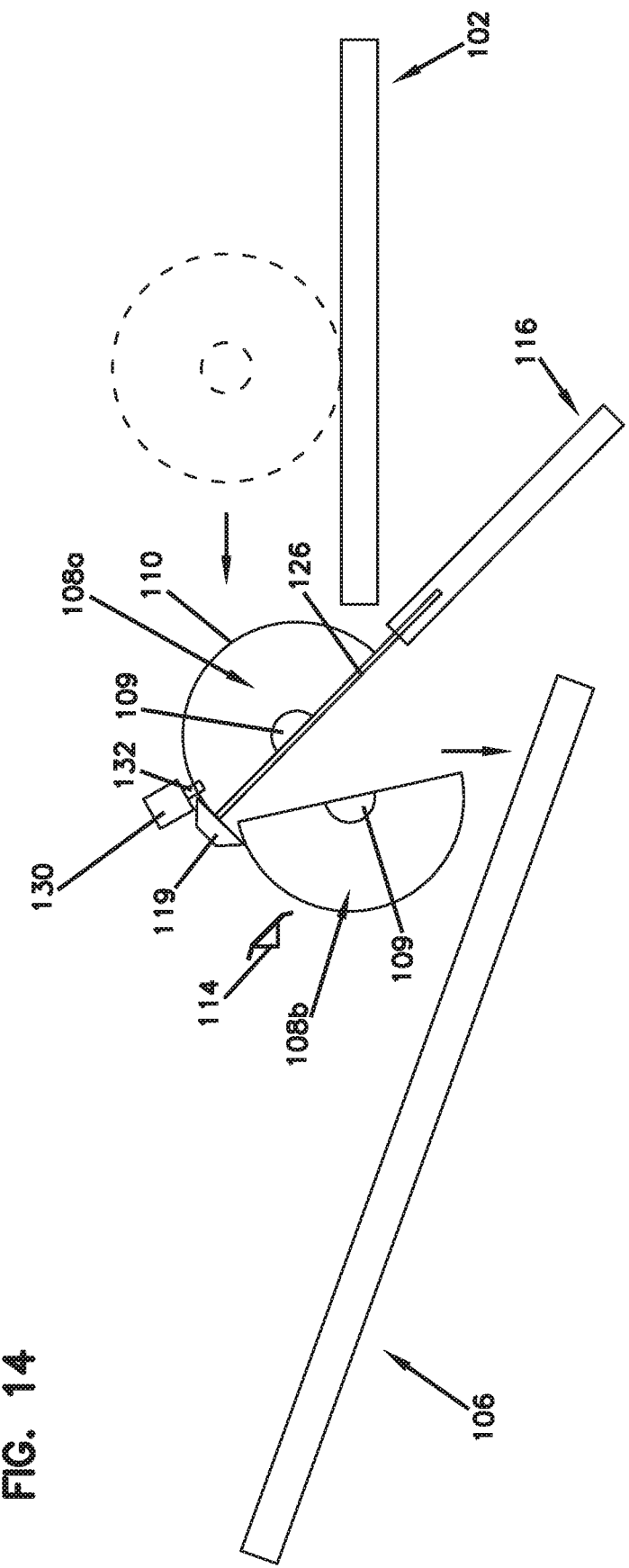

FIG. 14 shows a schematic side view of the bale processing machine 100. The cutting mechanism 116 is shown in the extended position and bale support 114 is shown in the raised position. The cutting mechanism 116, specifically the cutting blade 126, is shown to have penetrated and cut the bale 108 and binding 110. The depth of the cut can be partially influenced by the type of material that is contained within the bale 108. Certain materials tend to retain the baled shape once the binding 110 is cut, therefore requiring a deeper cut to properly separate the bale. In some embodiments, the cutting blade 126 only needs to cut the binding 110 for the bale to begin to separate. This is the case when using baled materials similar to cotton due to the material's tendency to expand after being released from compression (i.e. the cutting of the binding). In other embodiments, the cutting blade 126 penetrates less than 30 percent of the thickness of the bale 108. In other embodiments still, the cutting blade 126 penetrates between 30 and 100 percent of the thickness of the bale 108. In some embodiments, the cutting blade 126 penetrates at least 30 percent of the thickness of the bale 108. In other embodiments, the cutting blade 126 penetrates at least 50 percent of the thickness of the bale 108. In still other embodiments, the cutting blade 126 penetrates at least 70 percent of the thickness of the bale 108. Additionally, the blade 126 penetrates the bale 108 at an angle with horizontal (e.g., 30-60 degrees; or, in another variant, about 45 degrees). This angled penetration is advantageous as the bale portions 108a, 108b naturally separate upon cutting, due to gravity, more so than would occur with a vertical cut. A bale penetration angle of about 40-50 degrees further helps to promote even splitting of the bale 108, resulting in a generally even delivery of outfeed material.

As shown, the blade 126 is also configured to at least partially penetrate a core 109 of the bale. This is advantageous as the core 109 is typically dense and more difficult to process by downstream processing machines (i.e. grinders). By penetrating and separating the core 109 into separate portions 108a, 108b, downstream processing is eased. The bale portions 108a, 108b are shown as half cylinders for illustrative purposes only. The bale portions 108a, 108b can take a variety of shapes after cutting. FIG. 14 also shows the blade 126 supporting a portion of the bale 108a, as a second portion 108b begins to fall in a direction toward the outfeed conveyor 106. In some embodiments, the second portion 108b can fall by way of gravity to the outfeed conveyor 106, away from the first bale portion 108a and the binding 110.

In FIG. 14, the bale support 114 is shown to have traveled past the bale stop 119. In this position, the bale support 114 has removed the weight of the bale from the binding 110 so that the binding 110 is not pinned between the bale 108 and the bale support 114. Also at this time, the binding engagement device 132 has moved into the binding holding position, thereby securing the binding 110 within the pockets 188 between the hook plate 154 and the tine plate 152.

Figure 15:
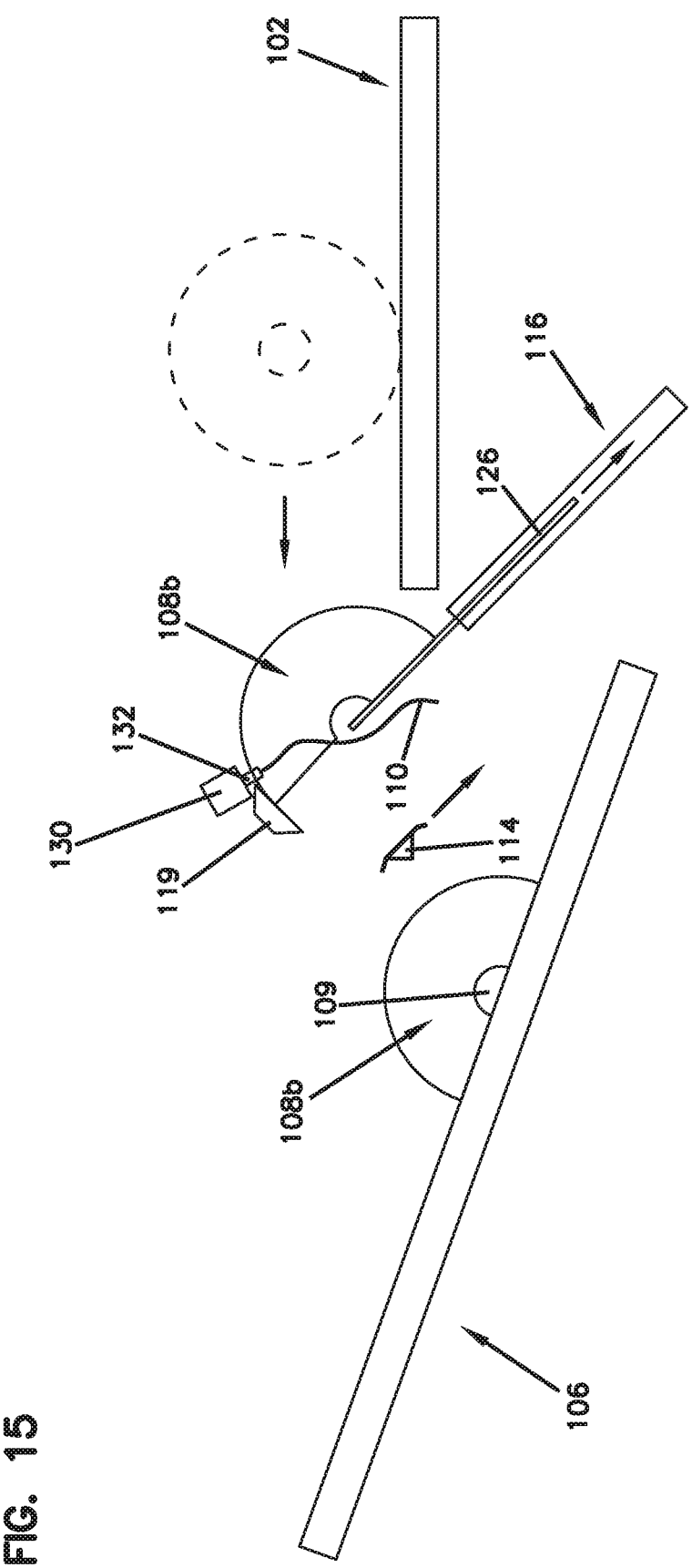

FIG. 15 shows the cutting mechanism 116 lowering from the extended position to the retracted position. As shown, the blade 126 is still supporting one portion of the bale 108a. Also, the binding engagement device 132 is shown to be secured to the binding 110. In some embodiments, at this stage in the cutting process, the binding engagement device 132 is also moving in a direction toward the disengaging end 140 of the binding removal arm 130. The binding 110 is shown being held by the binding engagement device 132, as it is pulled away from the bale portions 108a, 108b.

Figure 16:
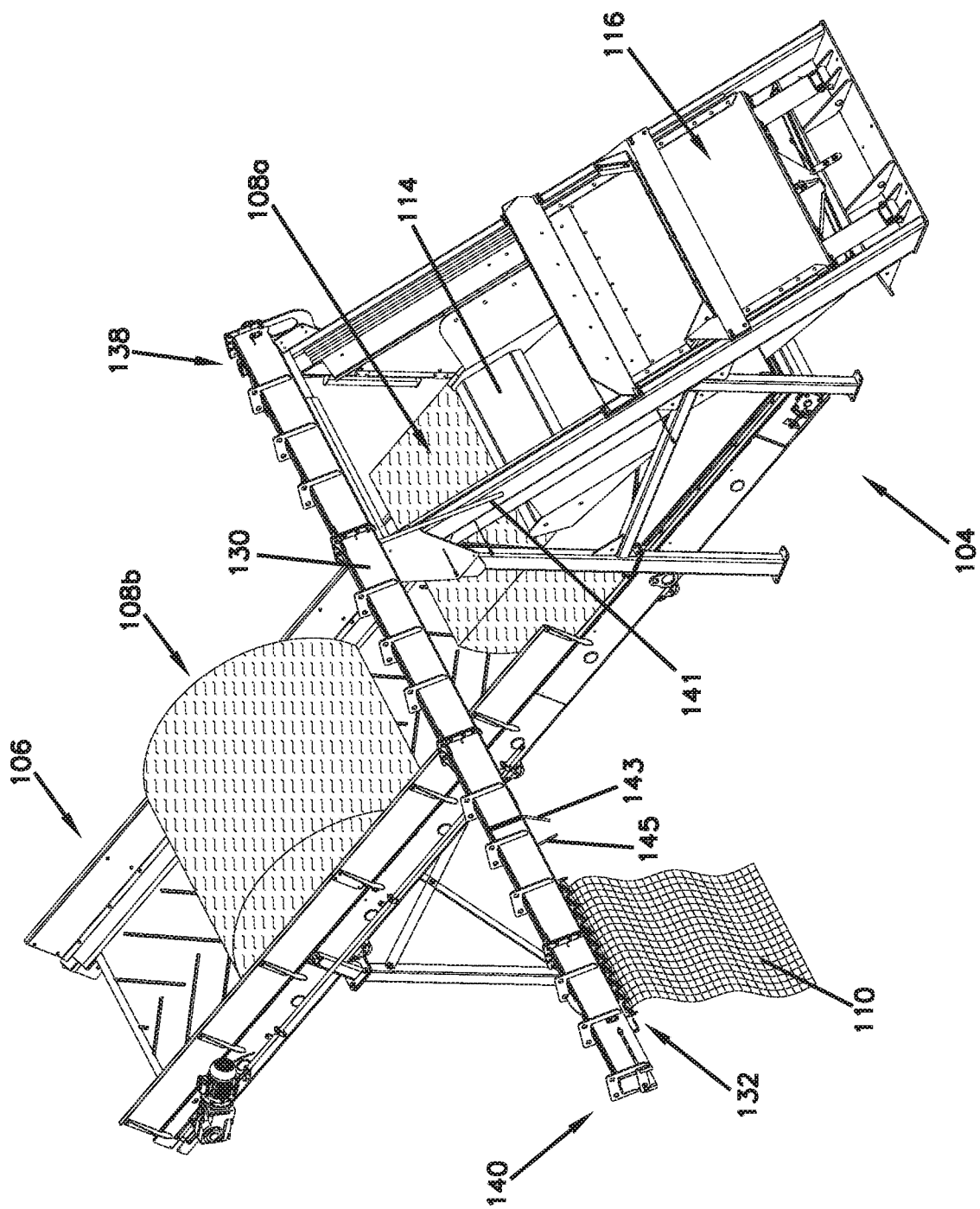
FIGS. 16-17 illustrate rear perspective views of the bale processing machine during the cutting operation.

FIG. 16 shows the cutting mechanism 116 and the bale support 114 in the lowered positions. Both portions 108a, 108b of the processed bale 108 are on the outfeed conveyor 106 being transported to a processed location. In some embodiments, the processed bale portions 108a, 108b are transported to a grinder, chopper, or other suitable comminuting device able to yield an appropriate sizing distribution. The binding 110 that was removed from the bale 108 is shown at the disengaging end 140 of the binding removal arm 130 being held by the binding engagement device 132.

Figure 17:
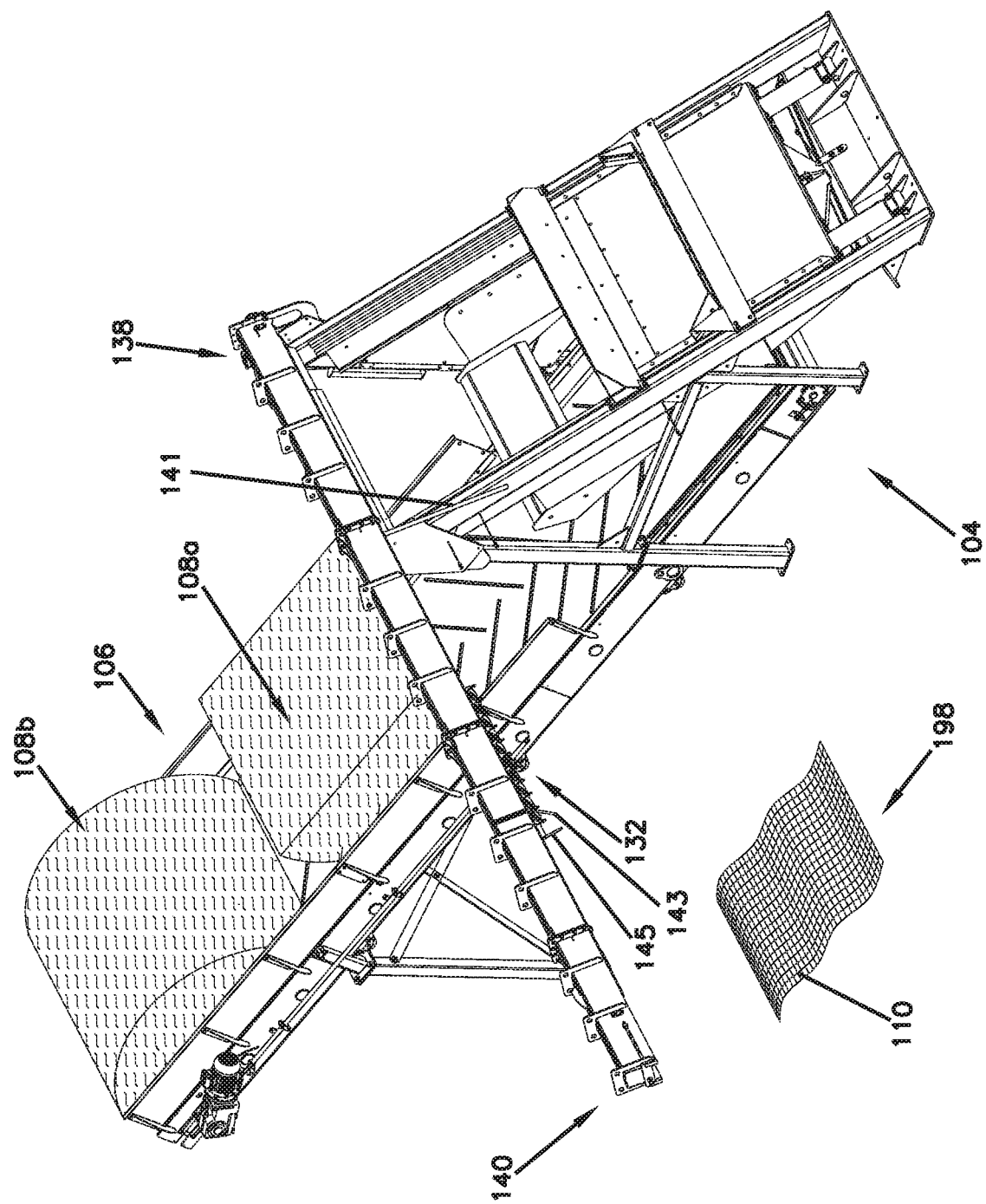

FIG. 17 shows the binding 110 released from the binding engagement device 132 and positioned at a disposal location 198 that is offset from the processing station 104. In some embodiments, the disposal location 198 can include an open bin (not shown) to catch the binding 110. The binding engagement device 132 is shown moving in a direction toward the engaging end 138 of the binding removal arm 130 and into the binding receiving/release position.

In some embodiments, the cutting process can be automated by a controller and a plurality of sensors. Example sensor feedback can include presence of a bale in the processing station 104, cut progression completed by the blade 126, the position of the blade 126 and/or bale support 114, status of the binding engagement device 132 being engaged by the bale 108, whether or not the binding engagement device 132 is in the binding holding position or the receiving/release position, and/or the position of the binding engagement device 132 with respect to the binding removal arm 130. A variety of other different sensors can be included in the bale processing machine to automate the overall cutting process. In other embodiments, the cutting processes can be manually controlled by separately operating particular portions of the bale processing machine 100.

Figure 18:
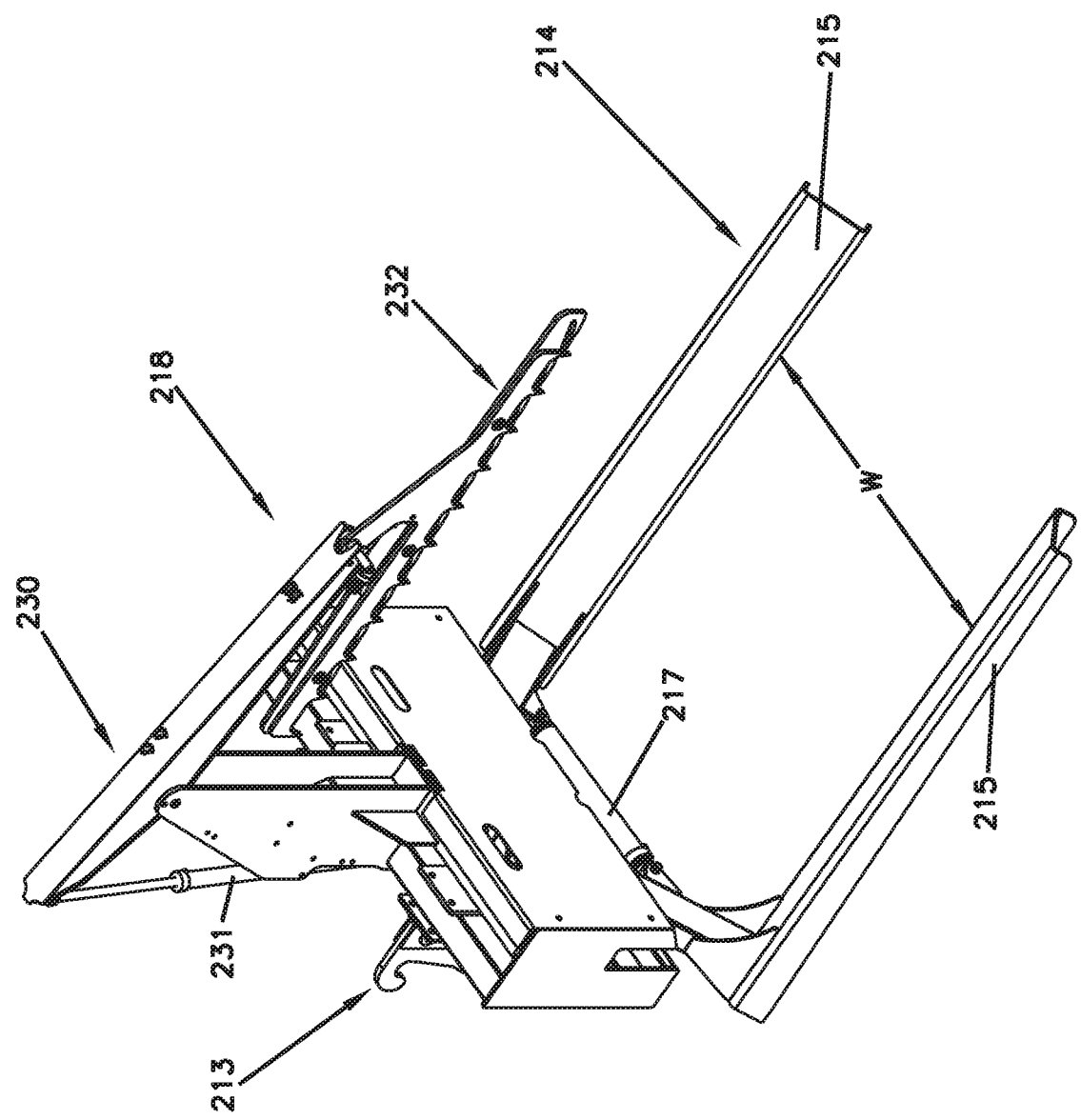
FIG. 18 illustrates a perspective view of a binding removal device, according to one embodiment of the present disclosure.
Figure 19:
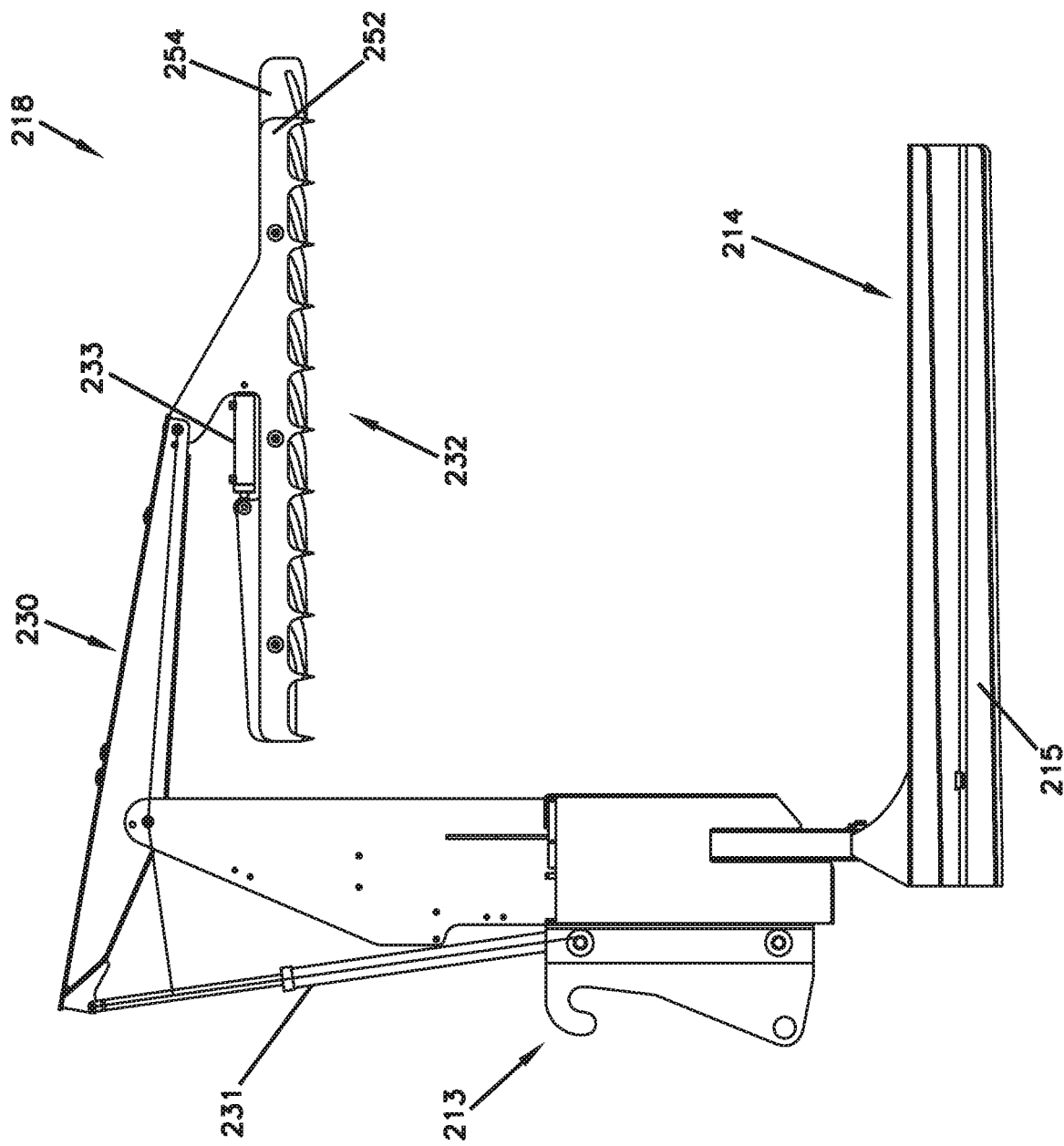
FIG. 19 illustrates a left side view of the binding removal device of FIG. 18.
Figure 20:
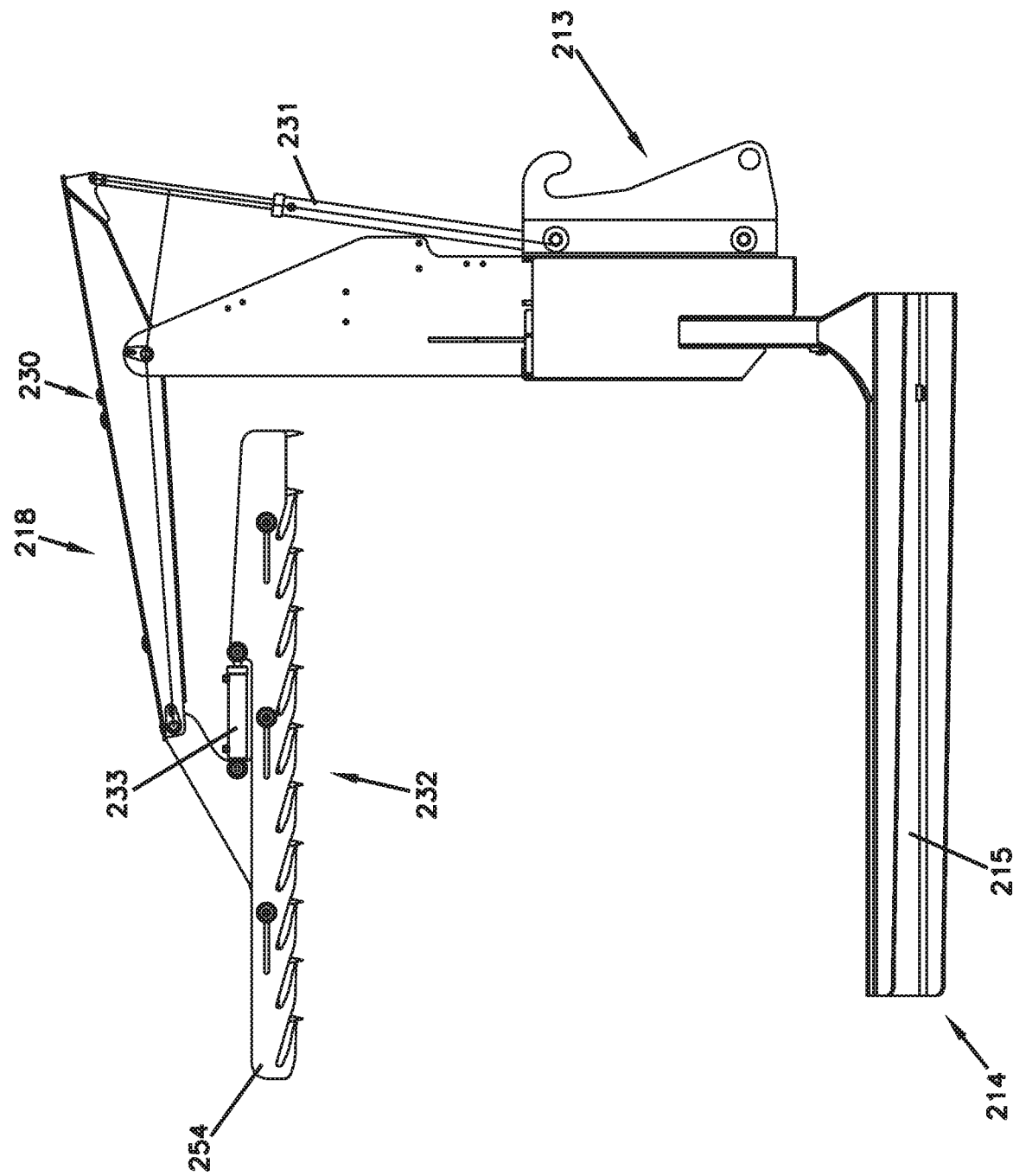
FIG. 20 illustrates a right side view of the binding removal device of FIG. 18.
Figure 21:
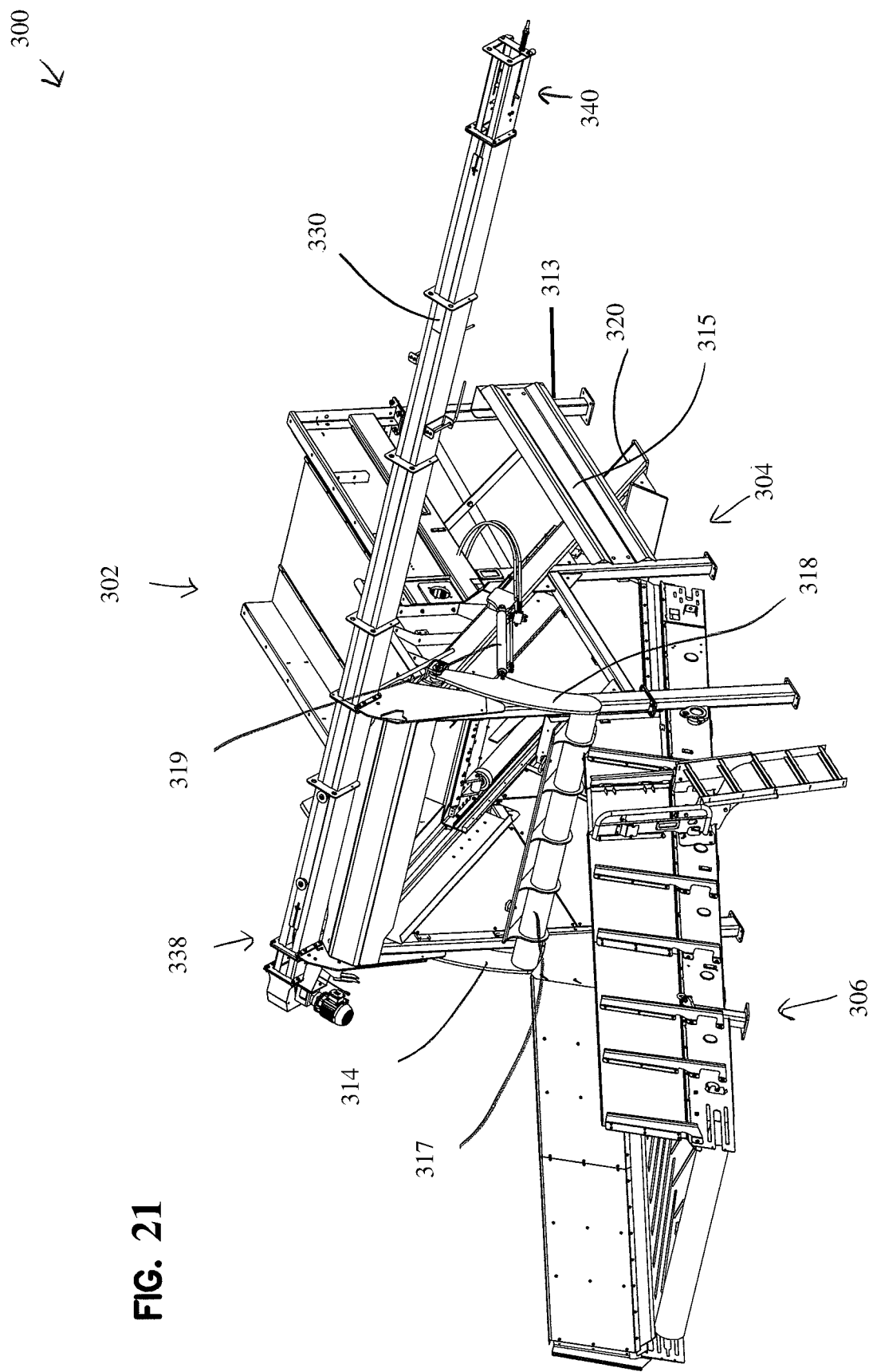
FIG. 21 illustrates a perspective view of a portion of a bale processing machine, according to one embodiment of the present disclosure.
Figure 22:
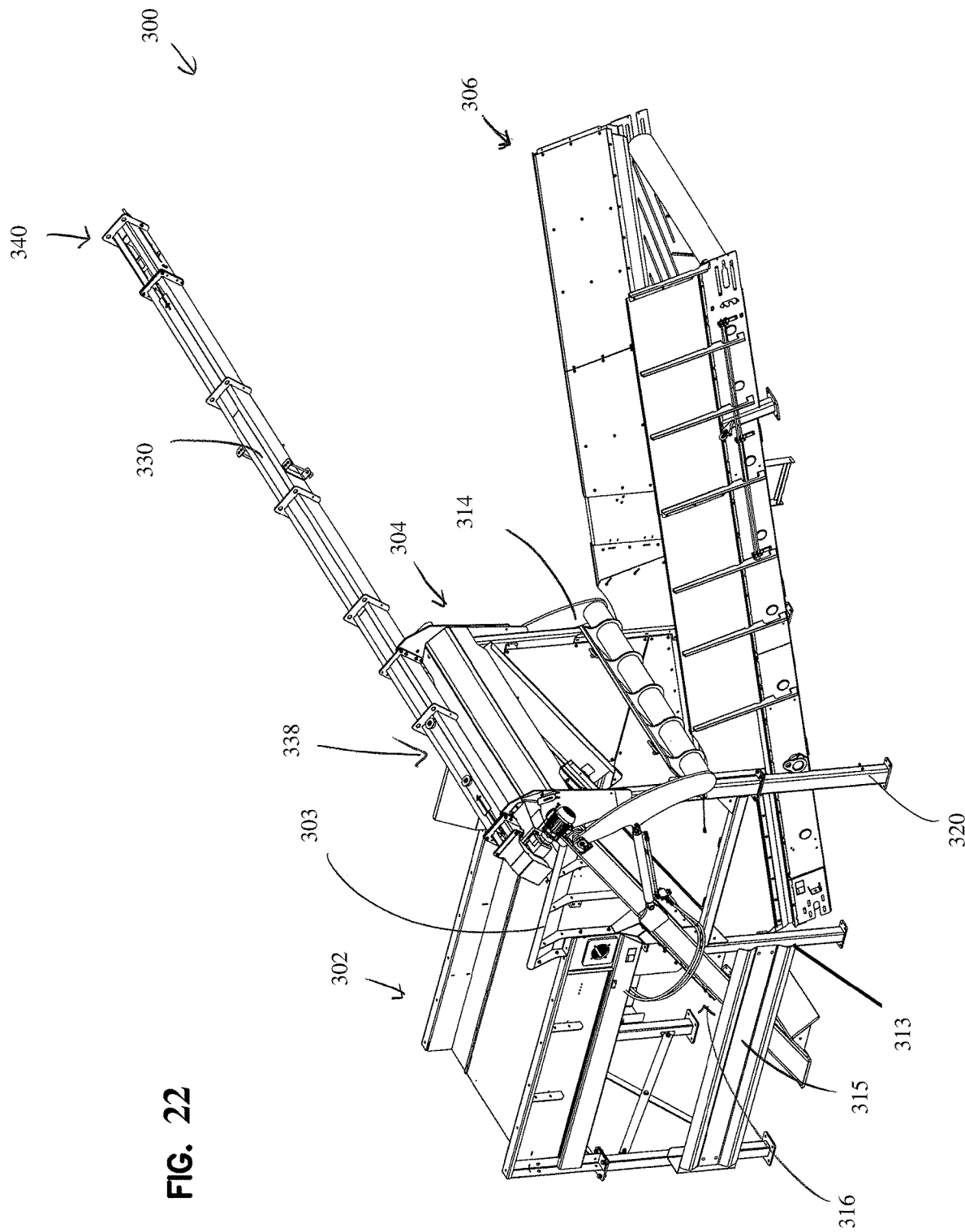
FIG. 22 illustrates another perspective view of the portion of a bale processing machine of FIG. 21.
Figure 23:
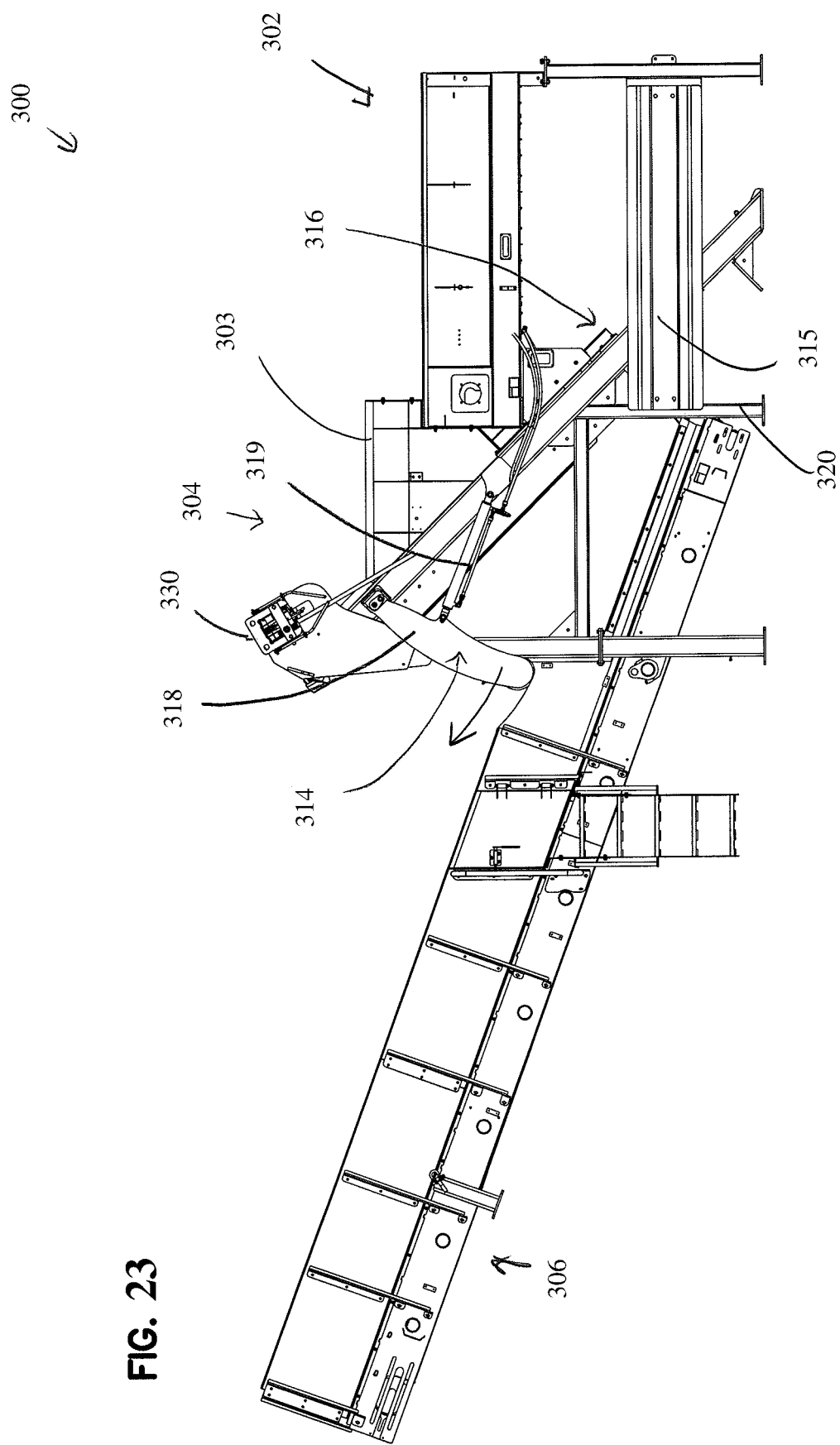
FIG. 23 illustrates left side view of the portion of a bale processing machine of FIG. 21.
Figure 24:
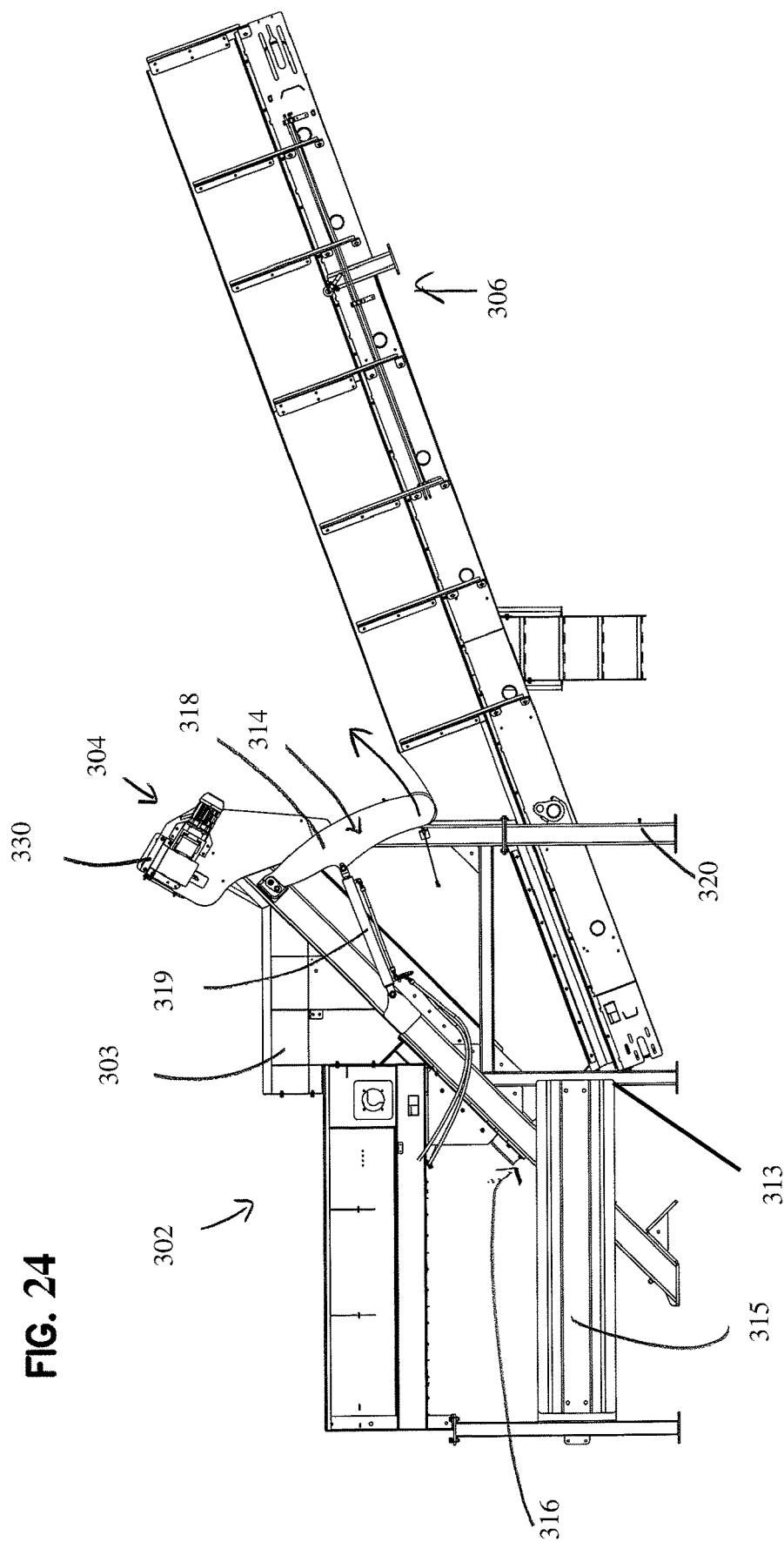
FIG. 24 illustrates a right side view of the portion of a bale processing machine of FIG. 21.
Figure 25:
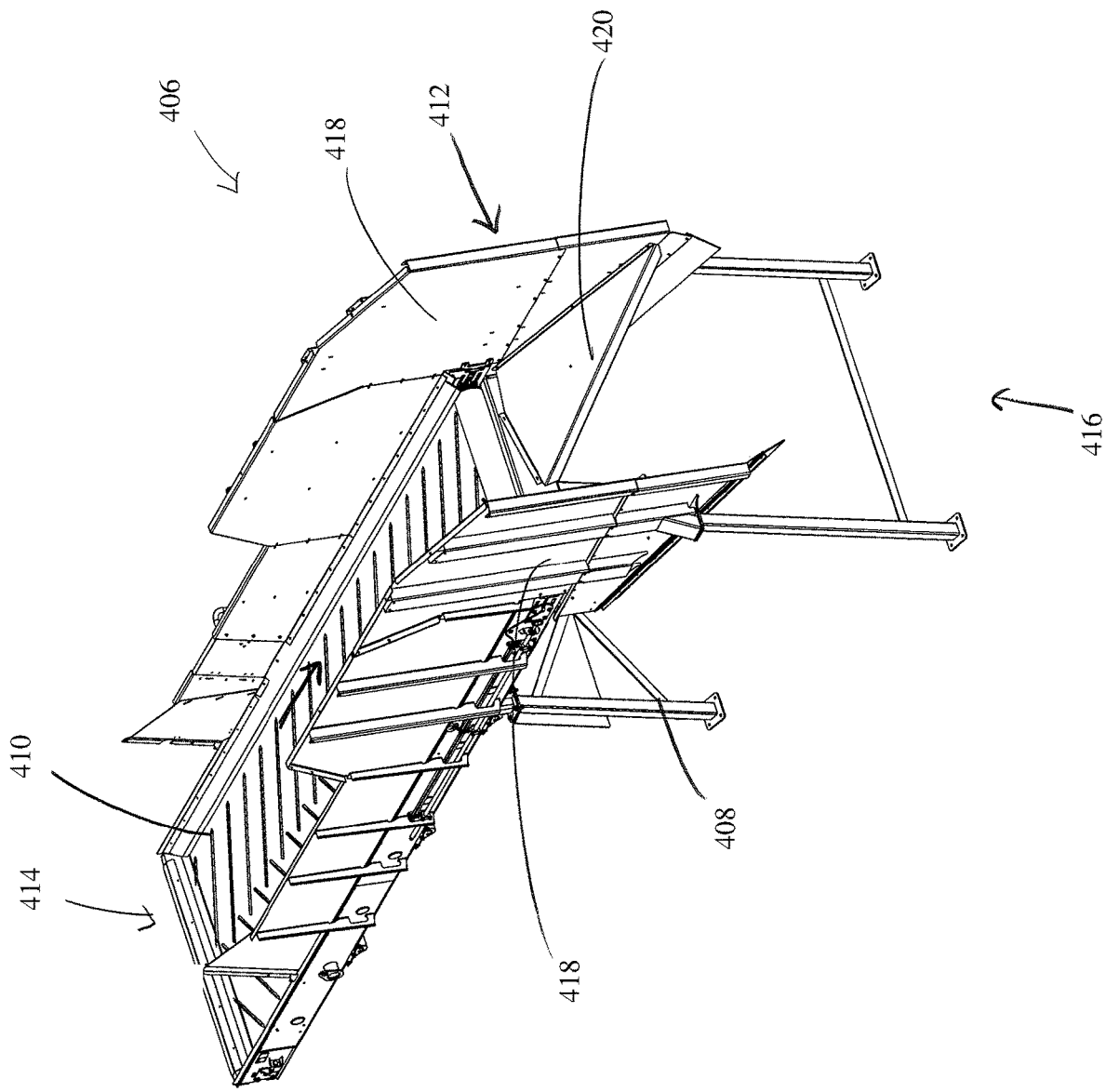
FIG. 25 illustrates a perspective view of an outfeed conveyor, according to one embodiment of the present disclosure.

FIGS. 18-20 show a binding removal device 218 according to one aspect of the present disclosure. The binding removal device 218 is configured to be attached to a separate machine, like a tractor or other like machine. The binding removal device 218 is configured to receive power from the tractor to facilitate the movement of binding removal device 218 during a binding removal process. Power may be supplied from the tractor in the forms of hydraulic power, electric power, pneumatic power, mechanical linkage, etc.

The binding removal device 218 includes a binding removal arm 230, a binding engagement device 232, a mounting device 213 and a bale support 214. The binding removal device 218 is configured to support a bale (ex. bale 108) by the bale support 214. The binding engagement device 232 then secures the binding (ex. binding 110) within the binding engagement device 232. The bale 108 is then removed from the binding removal device 218, and the binding engagement device 232 holds the removed binding 110.

The binding removal arm 230 of the binding removal device 218 is configured to position the binding engagement device 232 above the bale 108, while the bale is supported by the bale support 214. Additionally, the binding removal arm 230 is configured to be raised and lowered by a powered binding removal arm actuator 231 so that the binding engagement device 232 can engage and disengage the bale 108, specifically the binding 110, that is held by the bale support 114. In some embodiments, the binding removal arm actuator 231 is a hydraulic actuator. In other embodiments, the binding removal arm actuator 231 is a pneumatic actuator.

The binding engagement device 232 operates similarly to the binding engagement device 132 mentioned above. A tine plate 252 and a hook plate 254 are similar to the tine plate 152 and the hook plate 154 and are movable with respect to one another to secure, remove, and release the binding 110. Differing from the chain-powered binding engagement device 132, movement of the binding engagement device 232 is facilitated by the binding engagement device actuator 233 that is operable to move the binding engagement device 232 between a binding holding positon and a binding receiving/release position. In some embodiments, the binding engagement device actuator 233 is a hydraulic actuator. In other embodiments, the binding engagement device actuator 233 is a pneumatic actuator.

The mounting device 213 is configured to attach the binding removal device 218 to a separate machine. By mounting the binding removal device 218 to a separate machine, the binding removal device 218 can be made portable, which allows the user flexibility in choosing a binding removal location. Specifically, this is helpful when seeking to use the binding removal device 218 in a rural location, like a field.

The bale support 214 is configured to hold the bale 108. In some embodiments, the size of the bale support 214 can be adjusted to account for a variety of differently sized bales. In the depicted embodiment, the bale support 214 includes a pair of legs 215. When the bale 108 is resting on the legs 215, the legs 215 are spread at a width W that is equal to less than the diameter, or width, of the bale 108 so that the legs 215 are able to support the bale 108.

Once the binding 110 is secured by the binding engagement device 232, the legs 215 are moveable by a bale support actuator 217 and the width W is increased. Once the width W is increased beyond the bale diameter or width, the binding removal device 218 can be lifted away from the bale 108 while removing the binding 110. In other embodiments, the binding removal device 218 is elevated by the tractor so that the bale 108 drops to the ground once the width W between the legs 215 exceeds the diameter or width of the bale 108. As the bale falls, the binding 110 is retained by the binding engagement device 232.

FIGS. 21-24 show a portion of a bale processing machine 300, according to one embodiment of the present disclosure. The bale processing machine 300 is substantially similar to the bale processing machine 100 described above. The bale processing machine 300 includes an infeed conveyor 302, a processing station 304, and an outfeed conveyor 306.

The infeed conveyor 302 is configured to receive and transport a plurality of bales 108 to the processing station 304. In some embodiments, the infeed conveyor 302 includes side walls 303 that extend at least a third of the height of the bale that is to be processed.

The processing station 304 is shown to include a frame 313, a bale support 314, and a cutting mechanism 316. The frame 313 is configured to support the processing station 304 with a plurality of legs 320. In some embodiments, the legs 320 are connected to the infeed conveyor 302 via a cross supports 315 so as to interconnect the infeed conveyor 302 with the processing station 304.

Similar to the bale support 114 described above, the bale support 314 is configured to receive and support the bale 108 when the bale 108 is introduced to the processing station 304 from the infeed conveyor 302. In some embodiments, the bale support 314 cradles the bale 108 within the processing station 304 until the cutting operation is complete. In the depicted embodiment, the bale support 314 is pivotable between a lowered position and a raised position during the cutting operation.

The bale support 314 includes a pair of support arms 318 connected to a body 317. The arms 318 are pivotally connected to a portion of the processing station 304. The arms 318 are movable by way of a pair of actuators 319 that are attached to the arms 318 and to the processing station 304. The actuators 319 may be controlled by a control system and powered by hydraulic fluid or compressed air.

The body 317 of the bale support 314 is configured to support the bale 108 as the cutting mechanism 316 completes the cutting operation. The arms 318 can be pivoted away from the processing station 304 (as shown in the drawings by an arrow) until the bale support 314 is no longer supporting the bale, thereby allowing the bale 108 to fall to the outlet conveyor 306. Such pivoting of the body 317 can commence shortly have the cutting operation has begun. In some embodiments, the pivoting of the body 317 can commence after the cutting operation is complete.

FIGS. 25-29 show an outfeed conveyor 406. The outfeed conveyor 406 includes a transition portion 412 to allow for a smooth delivery transition to an adjacent machine (such as a grinder) or location. Like the outfeed conveyor 106 described above, the outfeed conveyor 406 is configured to receive the processed bale after the processing station 104, 304 has cut the bale 108 and removed the binding 110. The outfeed conveyor 406 can be configured to deliver the processed bale to another processing machine, for example a grinder, or to a storage location.

The outfeed conveyor 406 includes a frame 408, a movable conveyor 410, and a transition portion 412. The frame 408 is configured to position the movable conveyor 410 at an angle with the ground. In some embodiments, the frame 408 can be adjustable so as to change the angle that the movable conveyor 410 makes with the ground. The outfeed conveyor 406 is configured to receive portions of the bale 108 at a first end 414. The portions of the bale 108 then ride along the movable conveyor 410 to a second end 416 of the outfeed conveyor 406. Once at the second end 416, the portions of the bale 108 encounter the transition portion 412.

The transition portion 412 includes generally vertical shielding 418 and a ramp 420. The shielding 418 is configured to guide the bale 108 from the movable conveyor 410 to a location off the outfeed conveyer 406 (e.g., a grinder).

The ramp 420 is configured to catch and slow the fall of portions of the bale 108 when the portions of the bale reach the end of the movable conveyor 410 at the second end 416 of the outfeed conveyor 406. By slowing the fall from the movable conveyor 410, the portions of the bale 108 are less likely to damage a processing machine, such as a grinder, positioned adjacent the second end 416 of the outfeed conveyor 406. Further, by slowing the transition to either a processing machine or to a storage location, the portions of the bale are more likely to be properly positioned either in a processing machine or at a storage location.

Figure 26:
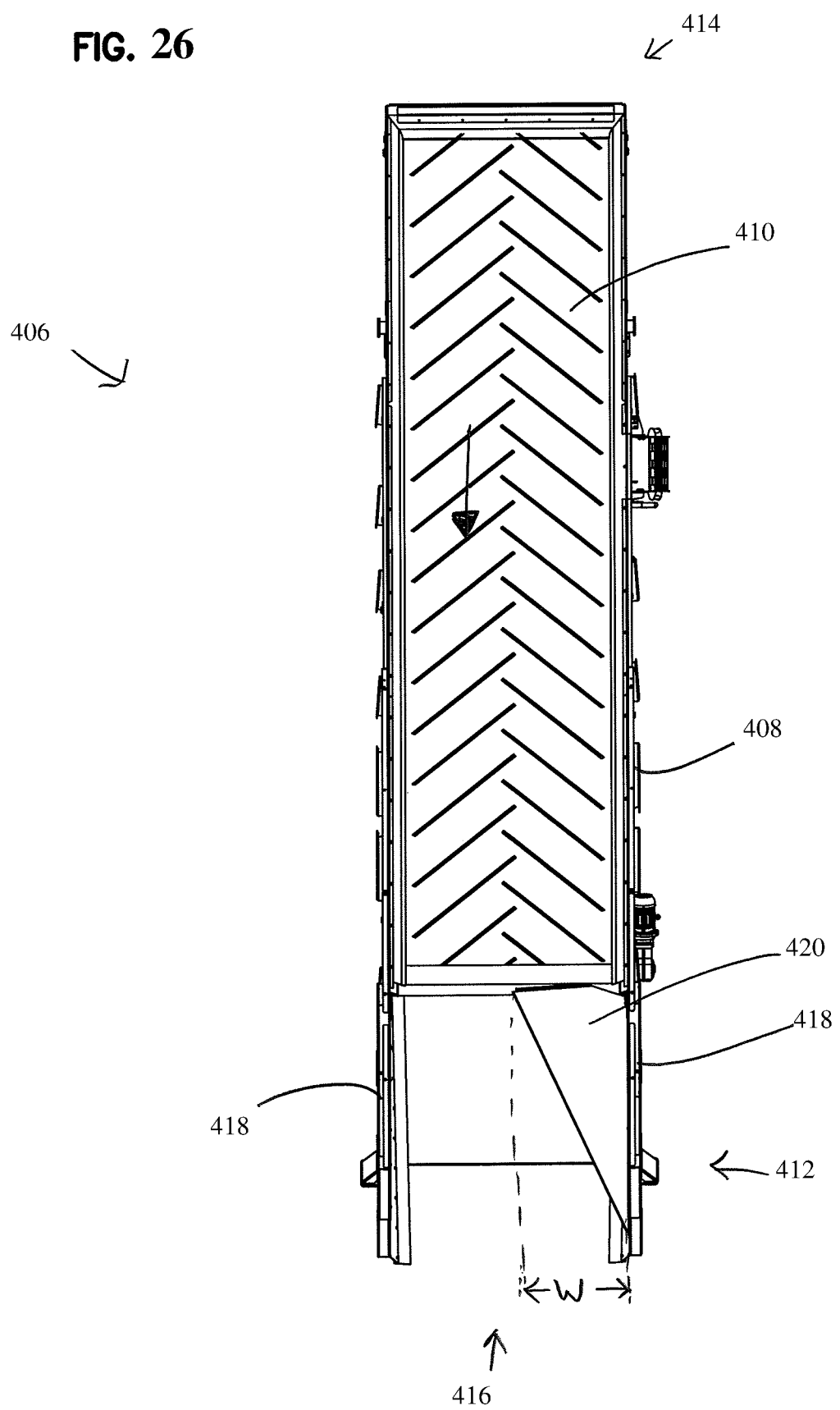
FIG. 26 illustrates a top view of the outfeed conveyor of FIG. 25.
Figure 27:
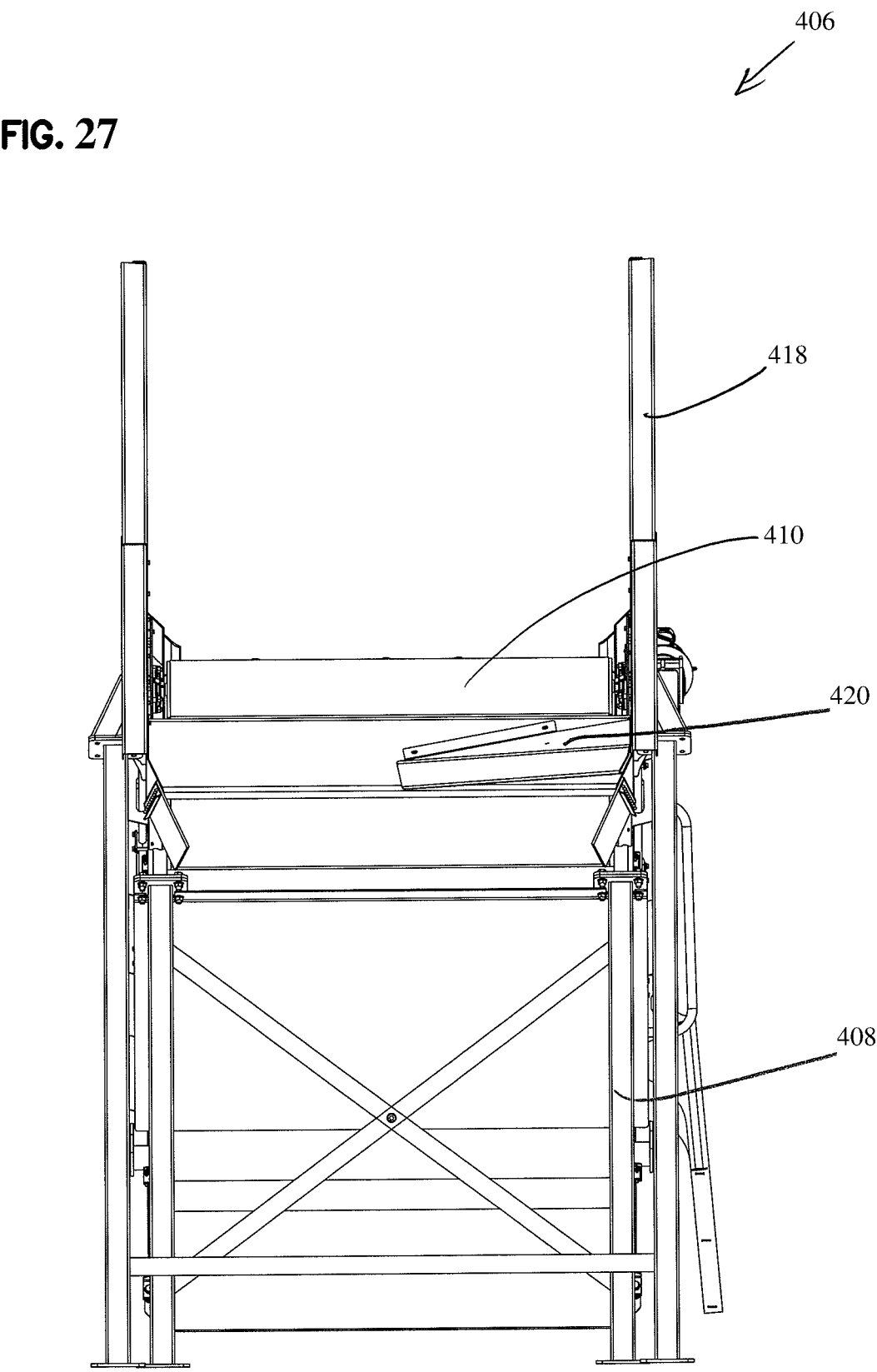
FIG. 27 illustrates a front view of the outfeed conveyor of FIG. 25.
Figure 28:
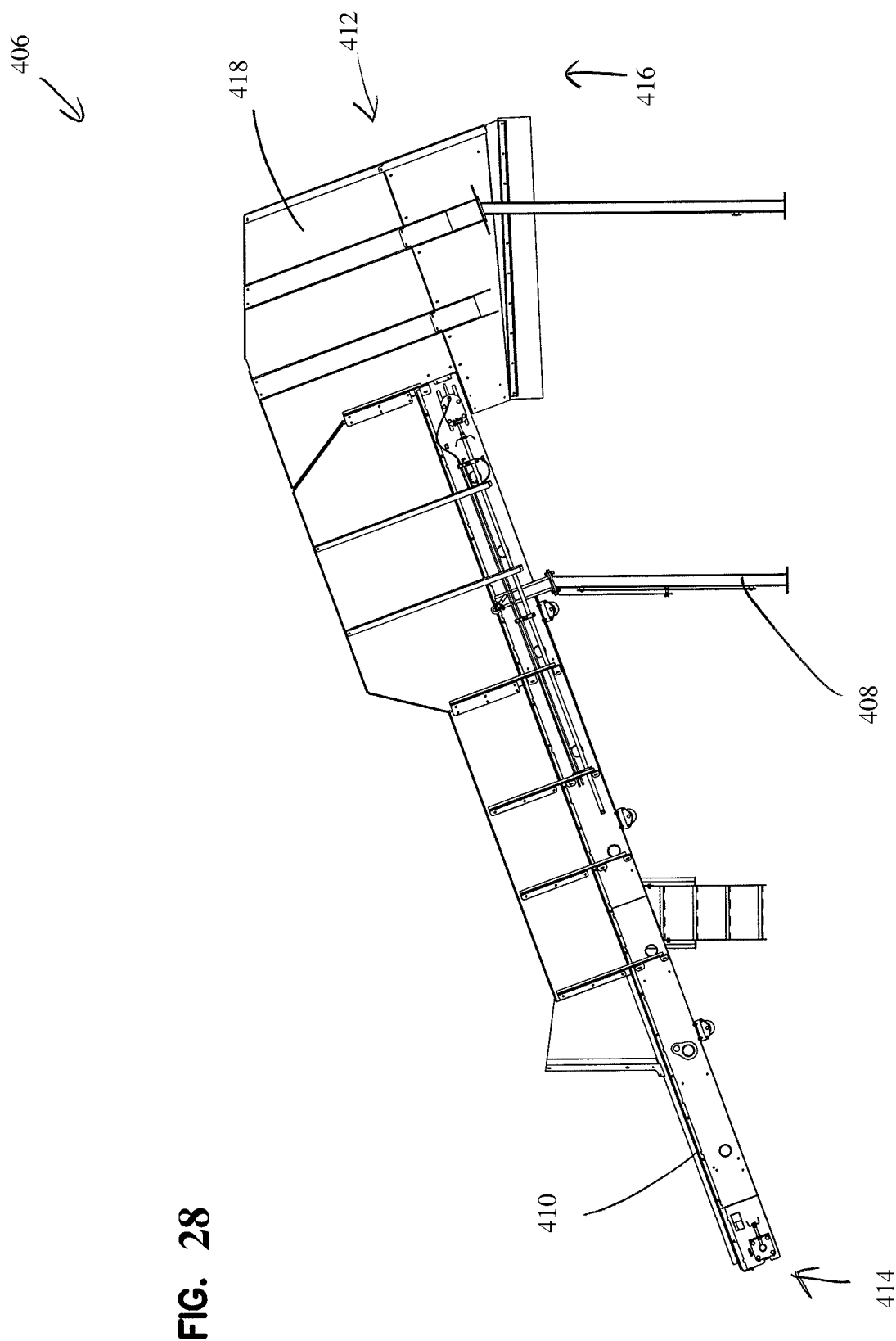
FIG. 28 illustrates a right side view of the outfeed conveyor of FIG. 25.
Figure 29:
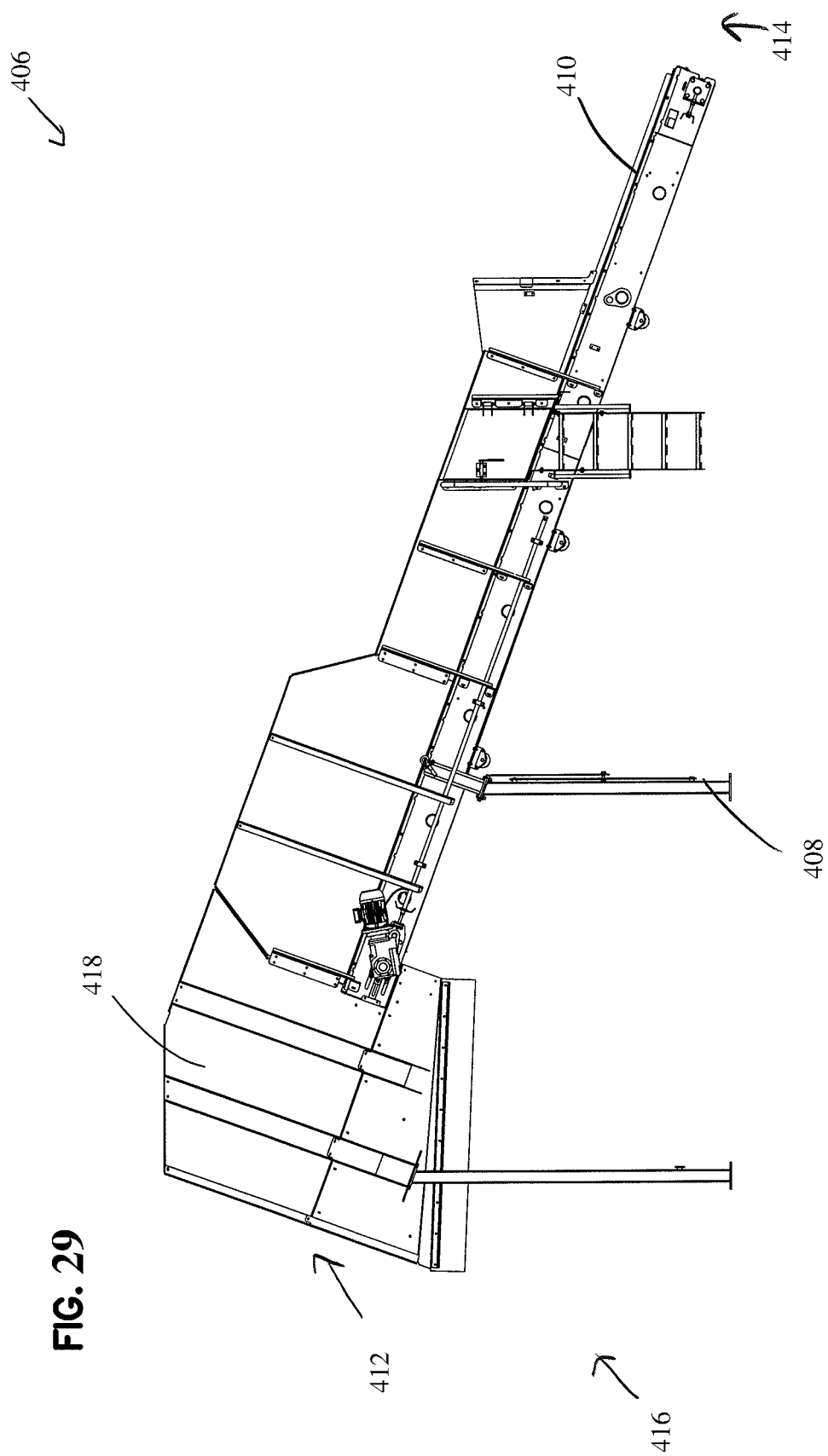
FIG. 29 illustrates a left side view of the outfeed conveyor of FIG. 25.

The ramp 420 is configured to be at least partially angled in a direction toward the ground and at least partially angled away from the second end 416 of the outfeed conveyor 406 along the path of travel (indicated by an arrow in the FIGS.) of the movable conveyor 410. In the depicted embodiment, the ramp 420 has a decreasing width W, as shown in FIG. 26, in a direction away from the second end 416. In some embodiments, the ramp 420 has a generally triangular shape. It is considered to be within the scope of the present disclosure that the ramp 420 can have a variety of different shapes so long as the ramp 420 aids in slowing the fall of the bale from the movable conveyor 410 at the second end 416 of the outfeed conveyor 406.

FIGS. 30-33 show a binding engagement device 532 in different positions that correspond with different portions of the cutting operation. The binding engagement device 532 operates in a substantially similar manner as the binding engagement device 132 described above. A pawl 550, similar to the engaging end pawl 150 described above, is also shown. The pawl 550 interacts with the binding engagement device 532 in a substantially similar manner as the pawl 150 and the binding engagement device 132 described above. Further, the binding engagement device 532 is also configured to interact with a disengaging pawl (not shown) in a substantially similar manner as the binding engagement device 132 and the disengaging end pawl 190.

The binding engagement device 532 can be mounted to the chain 146 and be movable along the binding removal arm 130 by way of the chain 146, similar to the binding engagement device 132. The binding engagement device 532 includes a tine plate 552 and a hook plate 554.

The tine plate 552 includes a plurality of individual tines 556 spaced apart along the length of the tine plate 552 so as to define a set of tines in a tine row. In some embodiments, the tines 556 are pointed and are configured to enter the bale 108 and anchor the binding 110 to the bale 108. In the depicted embodiment, the tine plate 552 includes angled pockets 553 between each tine 556.

Figure 30:
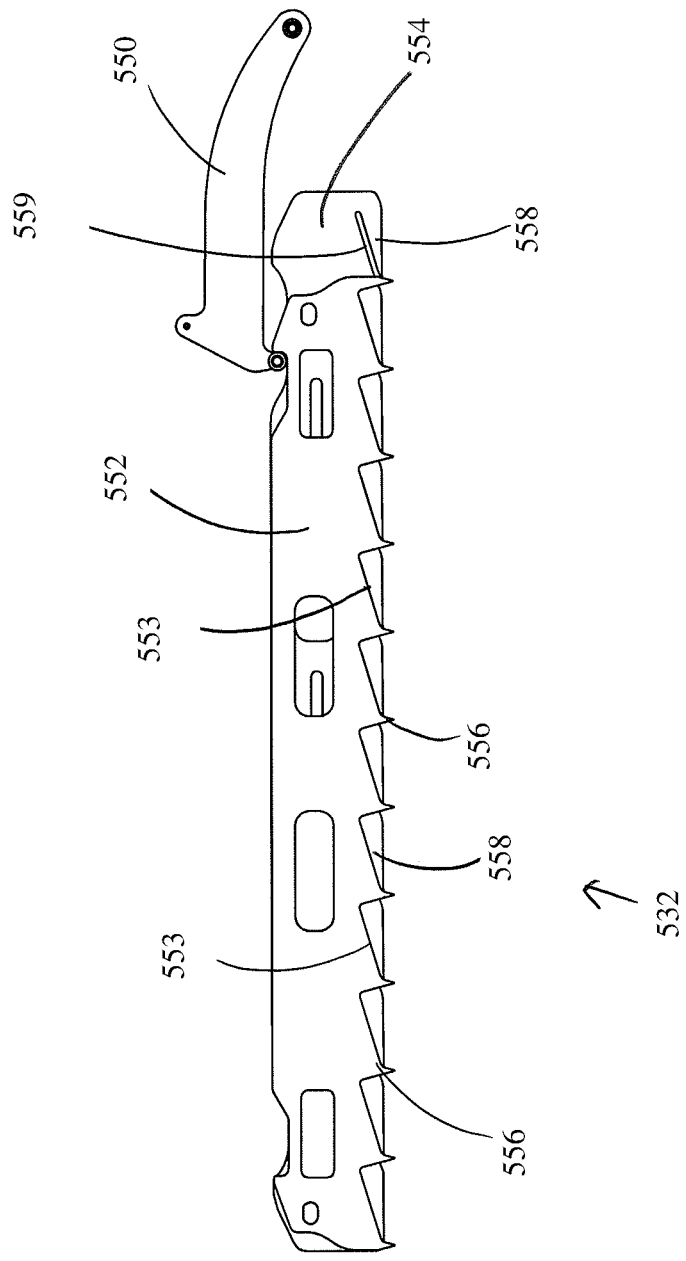
FIG. 30 illustrates a front view of an engaging end of a binding removal device in the binding receiving/release position, according to one embodiment of the present disclosure.

The hook plate 554 includes a plurality of individual hooks 558 and is movably mounted with respect to the tine plate 552 between a binding holding positon and a binding receiving/release position. In FIG. 30, the hook plate 554 and the tine plate 552 are shown in the binding receiving/release position. In some embodiments, the hooks 558 have a wedge shape and are separated by hook pockets 559 along the length of the hook plate 554. The amount of hooks 558 included on the hook plate 554 can range depending on the size of the hooks 558 and the size of the hook plate 554. It is contemplated that the hook plate 554 may contain more or less hooks 558 and related tines 556 than depicted in the FIGS.

Figure 31:
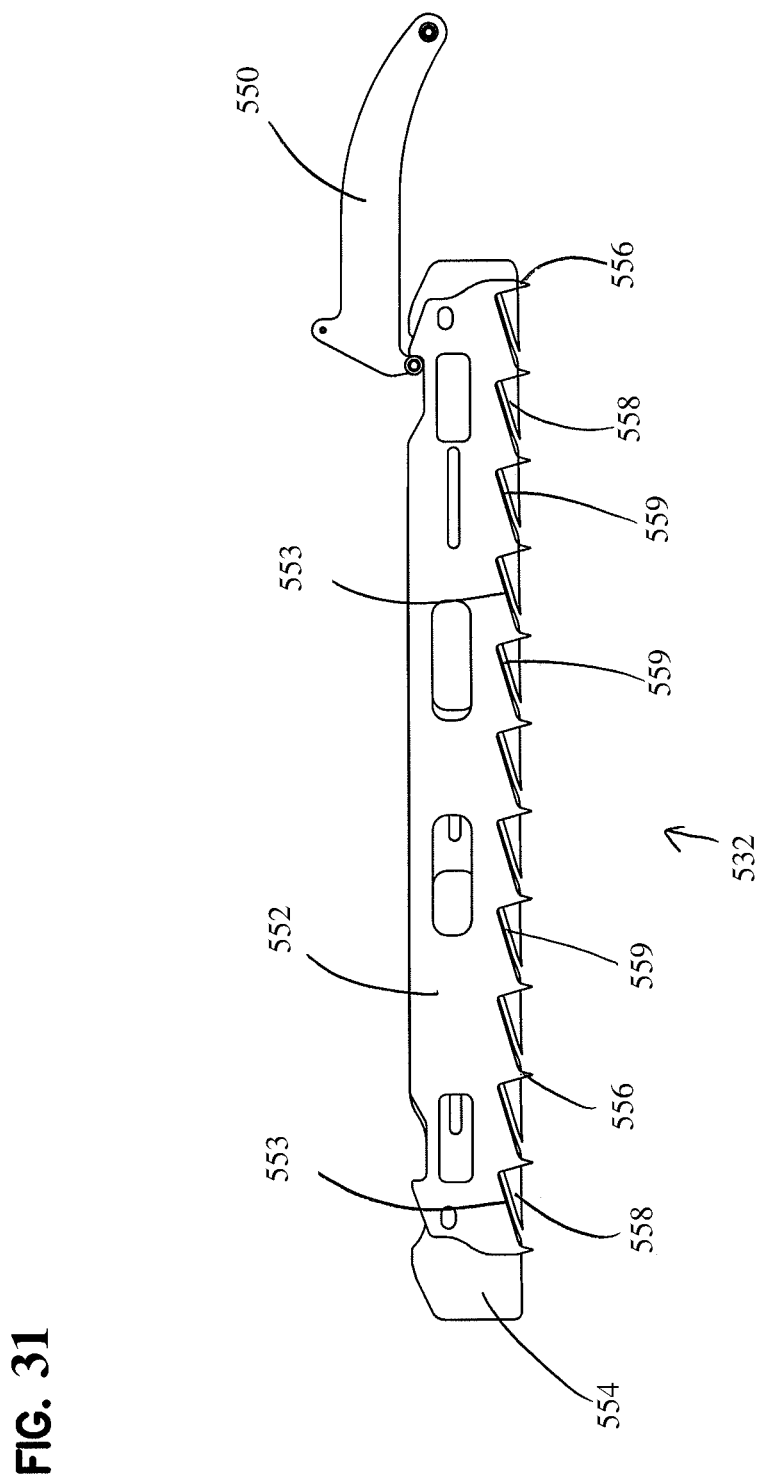
FIG. 31 illustrates a front view of the engaging end of the binding removal device of FIG. 30 between the binding receiving/release position and a binding holding position.
Figure 32:
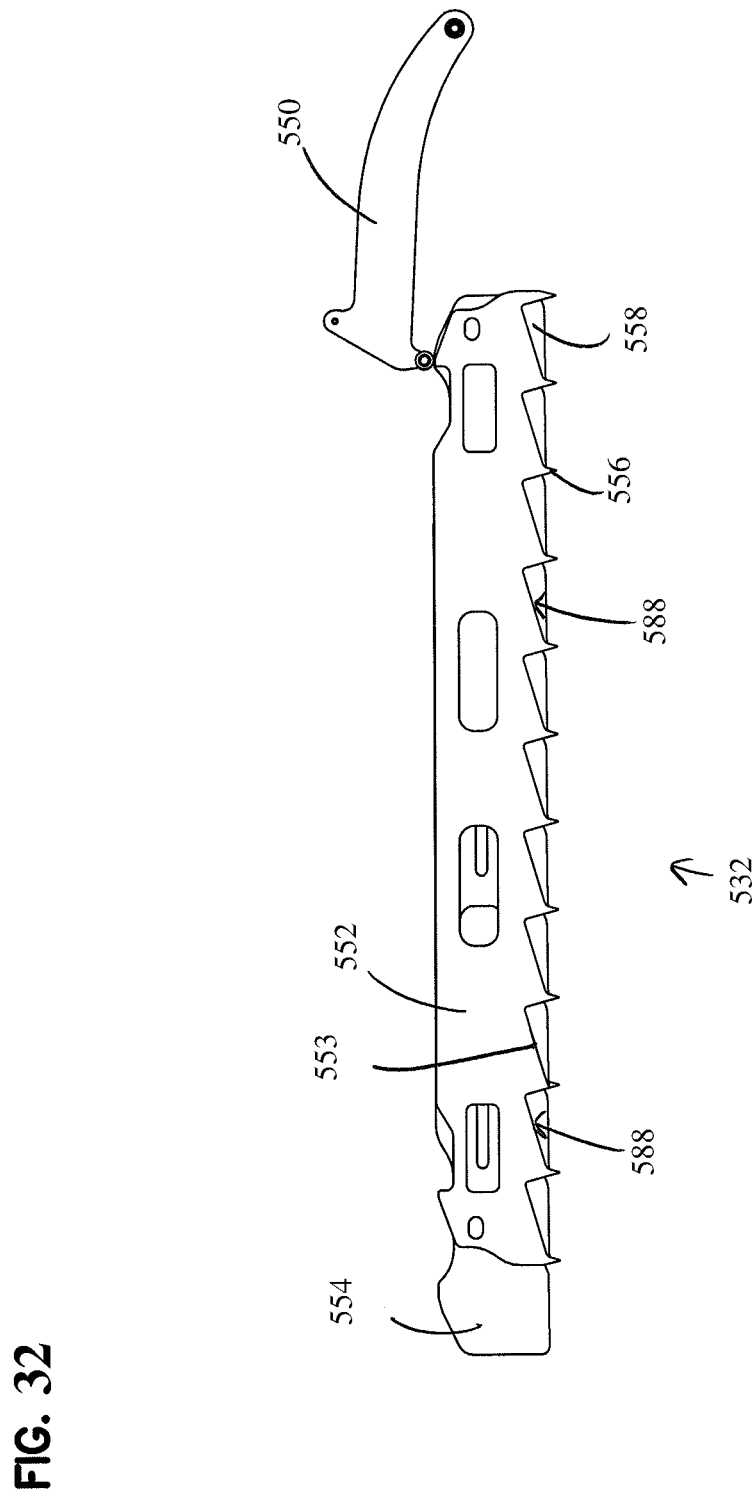
FIG. 32 illustrates a front view of the engaging end of the binding removal device of FIG. 30 in the binding holding position.
Figure 33:
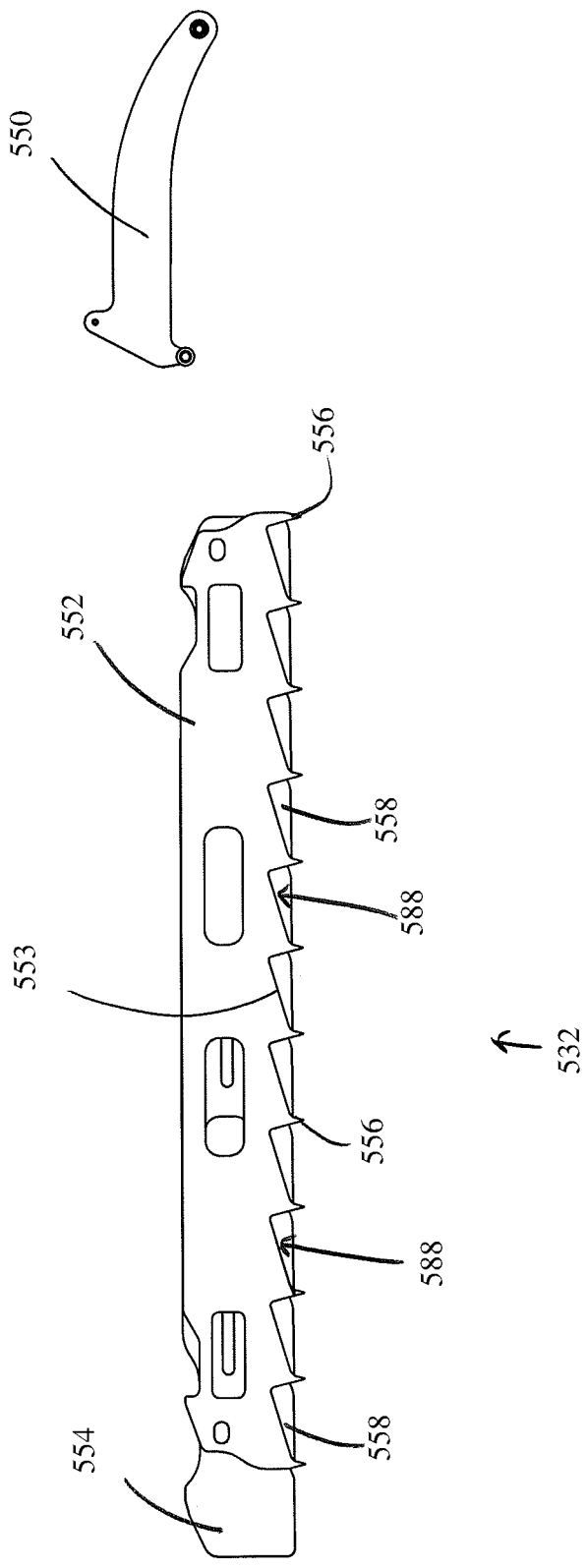
FIG. 33 illustrates a front view of the engaging end of the binding removal device of FIG. 30 in the binding holding position when a binding engagement device is disengaged with an end pawl.

FIG. 31 shows the binding engagement device 532 moving from the binding receiving position to the binding holding positon. FIGS. 32 and 33 show the binding engagement device 532 in the binding holding positon. In the binding holding position, the binding engagement device 532 is configured to hold the binding 110 in binding retaining pockets 588 defined by the tines 556, hooks 558, tine pockets 553, and hook pockets 559. In some embodiments, the pockets 588 are in a closed position when the binding engagement device 532 is in the binding holding position and an open position when the binding engagement device 532 is in the binding receiving/release position. When in the closed position, the binding 110 is secured within the plurality of pockets 588.

To further aid in retaining the binding 110 in the binding engagement device 532 when the binding engagement device 532 is in the binding holding position, the angled pockets 533 of the tine plate 552 substantially match the shape of the hooks 558. This allows the hook plate 554 and the tine plate 552 to pinch the binding 110 within the pockets 588 when in the binding holding position. Pinching the binding 110, which in some embodiments can be bale twine, can be important as it helps retain the binding 110 until the binding engagement device 532 reaches the disengaging end of the binding removal arm 130 and moves into the binding release position. In some embodiments, the hooks 558 and/or tines 556 can include a coating such as a rubberized or other similar coating to aid in gripping the binding 110. In other embodiments, the hooks 558 and/or tines 556 can include a textured surface. It is considered to be within the scope of the present disclosure that the tines and teeth may be a variety of different shapes that allow the binding engagement device 532 to secure the binding 110 when in the binding holding position.

Figure 34:
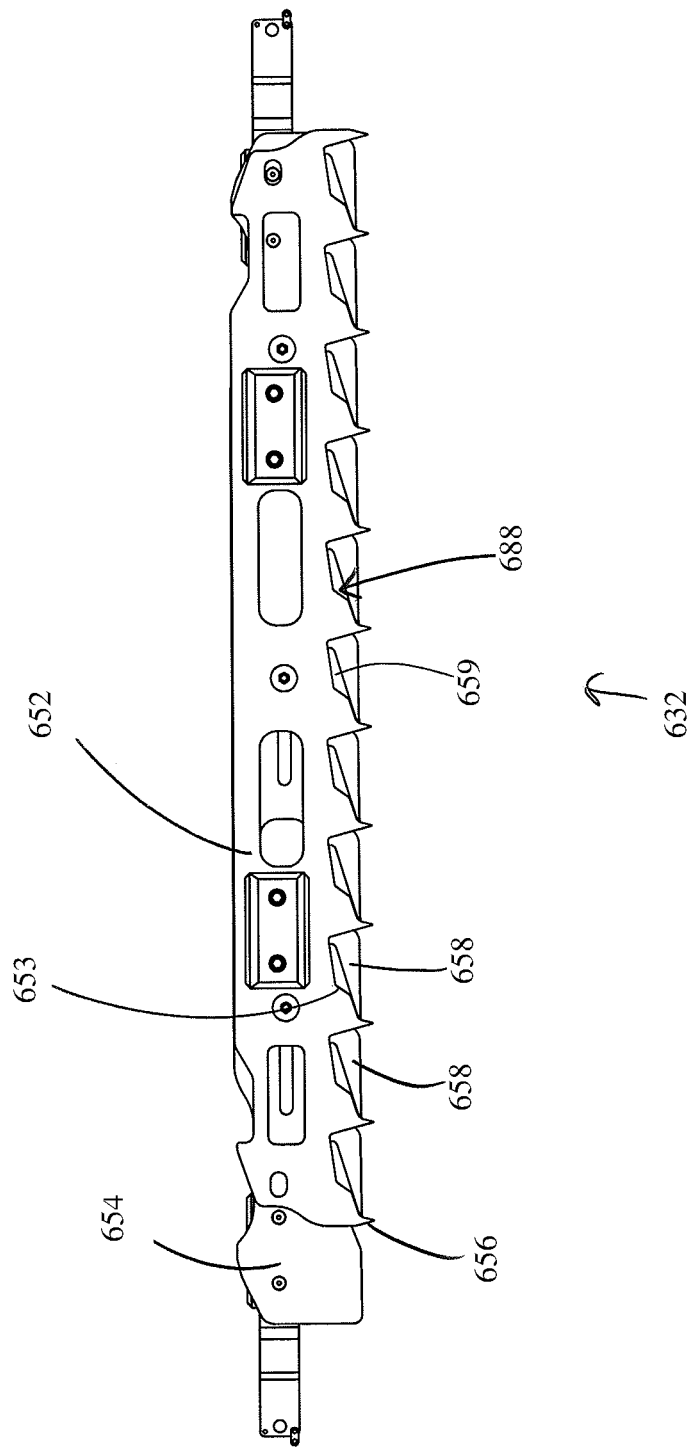
FIG. 34 illustrates a front view of the engaging end of a binding removal device in the binding holding position, according to one embodiment of the present disclosure.

FIG. 34 shows a binding engagement device 632 according to one embodiment of the present disclosure. The binding engagement device 632 operates in a substantially similar manner as the binding engagement devices 132 and 532, described above.

In the depicted embodiment, the binding engagement device 632 includes a tine plate 652 and a hook plate 654. The tine plate 652 includes a set of tines 656 and the hook plate 654 includes a set of hooks 658. Similar to above, the tines 656 and hooks 658 define pockets 688 which secure the binding 110 when the binding engagement device 632 is in the binding holding position. In the depicted embodiment, the tine plate 2 includes partially angled pockets 653 and, like the hooks 558 described above, the hooks 658 have a wedge shape and are separated by hook pockets 659 along the length of the hook plate 654. When in the binding holding position, as shown in FIG. 34, the partially angled pockets 653 and hooks 656 pinch the binding 100 at least partially in the pockets 688. Like above, the tines 656 and/or hooks 658 can include a textured surface or include a grip-like coating to aid in retaining the binding 110 within the binding engagement device 632 when in the binding retaining position.

Figure 35:
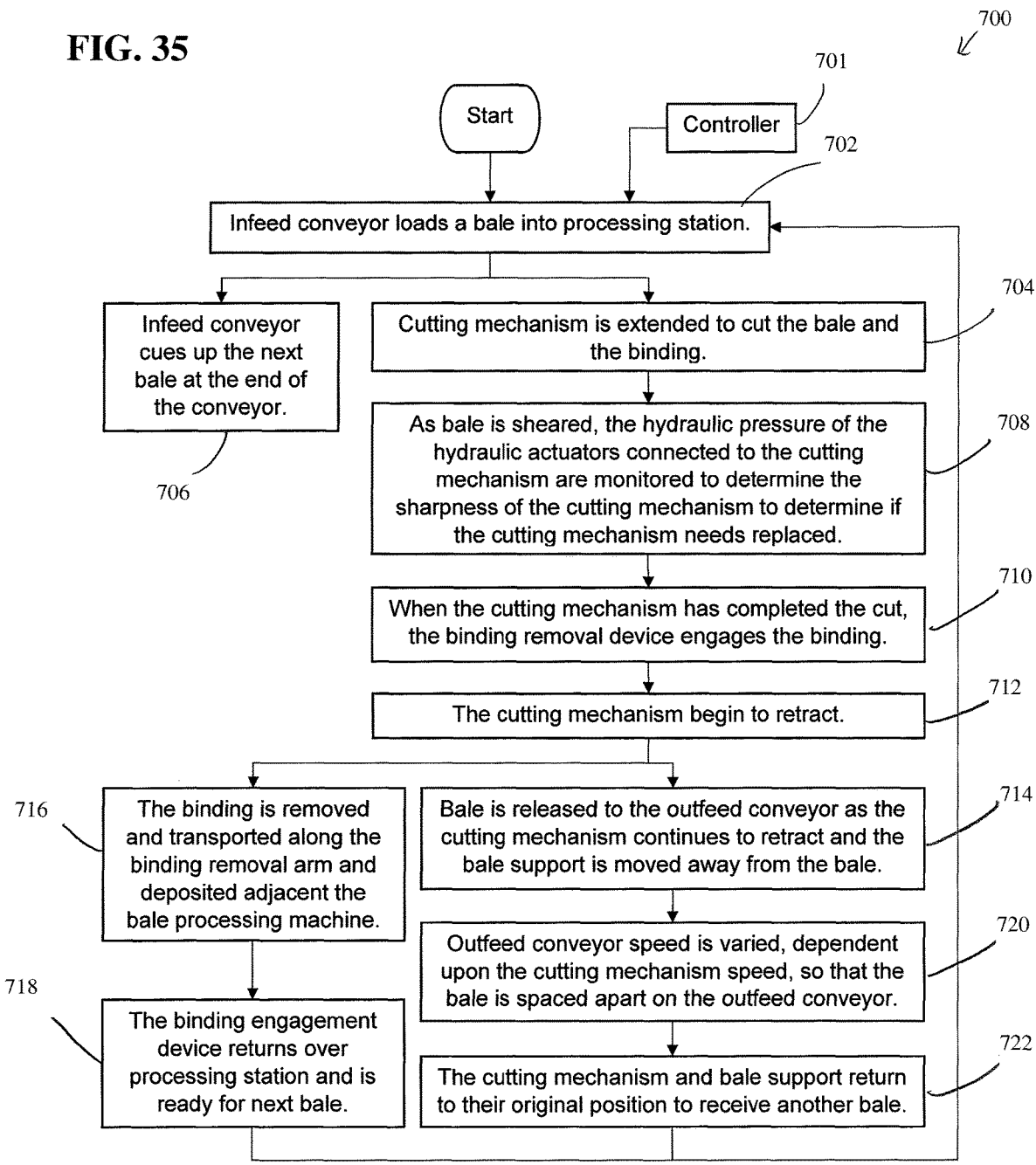
FIG. 35 illustrates a flow chart of an operating bale processing machine operating processes, according to one embodiment of the present disclosure.

FIG. 35 shows an example of an operating process 700 of the bale processing machine 100, 300. In some embodiments, a controller 701 automatically controls the components of the bale processing machine 100, 300 during the operating process 700.

At step 702, the infeed conveyor 102 provides a bale 108 to the processing station 104, 304. At step 704, the cutting mechanism 116, 316 in the processing station 104, 304 is extended by the hydraulic actuators 128 to cut the bale 108 and the binding 110. At step 706, while the processing station 104, 304 is performing step 704, the infeed conveyor 102, 302 is positioning another bale 108 for delivery to the processing station 104, 304. At step 708, as the bale 108 is being cut, the hydraulic pressure in the actuators 128 that move the cutting mechanism 116, 316 is monitored to ensure that the cutting mechanism 116, 316 is sufficiently sharp and does not need replacing. If the pressure reaches a maximum predetermined value in the actuators 128, it is likely the cutting mechanism 116, 316 is in need of replacement or needs to be sharpened. In some embodiments, the controller 701 notifies the user if the pressure exceeds the predetermined value in the actuators 128.

As the cutting mechanism 116, 316 is performing the cut of the bale 108 and the binding 110, at step 710 the binding engagement device 132, 532, 632 engages and secures the binding 110 from the bale 108. At step 712, the cutting mechanism 116, 316 completes the cut and begins to retract to the lowered position. At step 714, the bale 108 is released to the outfeed conveyor 106, 306, 406 as the bale support 114, 314 and cutting mechanism 116, 316 retract to their lowered positions, respectively. As the bale 108 is released to the outfeed conveyor 106, 306, 406, the binding engagement device 132, 532, 632 retains the binding 110 at step 716 and moves the binding 110 along the binding removal arm 130 to the disposal location 198 adjacent the bale processing machine 100, 300. Once the binding 110 is released from the binding engagement device 132, 532, 632, the binding engagement device 132, 532, 632 returns to its original position over the processing station 104, 304 at step 718.

Once the cut bale is on the outfeed conveyor 106, 306, 406, the speed of the outfeed conveyor 106, 306, 406 is adjusted at step 720 to ensure that the two halves 108a, 108b of the cut bale are spaced apart from one another along the outfeed conveyor 106, 306, 406. Finally, at step 722, the bale support 114, 314 and cutting mechanism 116, 316 return to their lowered positions, and the bale processing machine 100, 300 is then ready to receive another bale 108, and the process 700 is repeated.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

We claim:

1. An apparatus for removing a binding from a bale, the apparatus comprising:
   a bale support for supporting a portion of the bale; and
   a binding engagement device including at least one tine and at least one hook positioned proximate to the at least one tine, wherein the at least one hook is configured to move linearly relative to the at least one tine, and wherein the binding engagement device automatically removes the binding from the bale; and
   a cutting blade for cutting the binding and the bale at a cutting station during a cutting operation in which the cutting blade cuts the binding and at least a portion of the bale during travel of the cutting blade upward toward the binding engagement device and into a core of the bale, and wherein the upward travel of the cutting blade into the bale moves the bale upward into engagement with a stationary bale stop structure.

2. The apparatus of claim 1, wherein the bale stop structure is positioned above the bale when the bale is supported on the bale support and cutting blade, the cutting blade being configured to lift the bale as the cutting blade moves from a lowered position toward a raised position until the bale engages the bale stop structure, the cutting blade being configured to continue to move toward the raised position after the bale engages the bale stop structure, such that the cutting blade cuts through the binding and at least a portion of the bale and such that the bale support moves at least partially out from beneath the bale.

3. The apparatus of claim 1, wherein the cutting blade and bale support are configured to move at an angle relative to horizontal.

4. The apparatus of claim 1, wherein the bale support is pivotally attached to the cutting station, and wherein the bale support pivots away from the cutting station when moving at least partially out from beneath the bale.

5. The apparatus of claim 1, further comprising a guide defining a guide direction extending along a length of a binding removal arm, wherein the binding engagement device is movable along the guide direction between a first position over the cutting station and a second position offset from the cutting station, the at least one tine including a set of tines being spaced apart along the guide direction so as to define a tine row and the at least one hook including a set of hooks being spaced apart along the guide direction so as to define a hook row, the hook row being linearly movable relative to the tine row along the guide direction between a binding holding position and a binding release position.

6. The apparatus of claim 5, wherein the hook row and the tine row cooperate to define binding retaining pockets when the hook row is in the binding holding position.

7. The apparatus of claim 6, wherein the at least one hook has a longitudinal direction that extends transversely with respect to a longitudinal direction of the at least one tine.

8. The apparatus of claim 6, wherein the at least one hook and the at least one tine cooperate to pinch the binding when in the binding holding position.

9. The apparatus of claim 5, wherein the binding removal arm includes an engaging end at which the binding is removed from the bale by the binding engagement device and an opposite disengaging end for disposing of the binding by the binding engagement device, the binding removal arm including at least a pair of guide fingers positioned apart along a length of the binding removal arm, the guide fingers being at least partially angled.

10. The apparatus of claim 1, wherein the at least one hook includes at least a partially textured outer surface.

11. The apparatus of claim 1, wherein the bale support is configured to selectively move at least partially out from beneath the bale.

12. The apparatus of claim 1, wherein the cutting blade is configured to move at an angle relative to horizontal.

13. The apparatus of claim 12, wherein the cutting blade is configured to move at an angle between 30 degrees and 60 degrees from horizontal.

14. The apparatus of claim 1, wherein the cutting blade penetrates at least 30 percent of the thickness of the bale during the cutting operation.

15. The apparatus of claim 14, wherein the cutting blade penetrates at least 50 percent of the thickness of the bale during the cutting operation.

16. The apparatus of claim 15, wherein the cutting blade penetrates at least 70 percent of the thickness of the bale during the cutting operation.

17. The apparatus of claim 1, wherein when the cutting blade travels upward toward the binding engagement device and into the core of the bale, a first portion of the bale is beneath the cutting blade and unsupported by the bale support, and a second portion of the bale is above the cutting blade and supported by the cutting blade.

18. The apparatus of claim 17, further including an exit conveyor configured to first receive the first portion of the bale from the cutting station, and subsequently receive the second portion of the bale from the cutting station after the cutting blade moves to a retracted position.

* * * * *